(12) United States Patent
Sadakane et al.

(10) Patent No.: US 12,226,977 B2
(45) Date of Patent: Feb. 18, 2025

(54) LAMINATED GLASS

(71) Applicant: AGC Inc., Tokyo (JP)

(72) Inventors: Shunsuke Sadakane, Tokyo (JP);
Yuhei Gima, Tokyo (JP)

(73) Assignee: AGC INC., Tokyo (JP)

( * ) Notice: Subject to any disclaimer, the term of this patent is extended or adjusted under 35 U.S.C. 154(b) by 1074 days.

(21) Appl. No.: 17/093,484

(22) Filed: Nov. 9, 2020

(65) Prior Publication Data

US 2021/0059022 A1 Feb. 25, 2021

Related U.S. Application Data

(63) Continuation of application No. PCT/JP2019/021128, filed on May 28, 2019.

(30) Foreign Application Priority Data

May 30, 2018 (JP) ................... 2018-103406

(51) Int. Cl.
| | |
|---|---|
| *H05B 3/86* | (2006.01) |
| *B32B 7/12* | (2006.01) |
| *B32B 17/10* | (2006.01) |
| *B60J 1/00* | (2006.01) |
| *C09J 133/04* | (2006.01) |
| *H05B 3/06* | (2006.01) |
| *H05B 3/14* | (2006.01) |

(52) U.S. Cl.
CPC .......... *B32B 17/10036* (2013.01); *B32B 7/12* (2013.01); *B32B 17/10165* (2013.01);
(Continued)

(58) Field of Classification Search
CPC ............. B32B 17/10; B32B 17/10036; B32B 17/10165; B32B 17/10229;
(Continued)

(56) References Cited

U.S. PATENT DOCUMENTS

| | | |
|---|---|---|
| 6,065,221 A | 5/2000 | Wang |
| 8,383,988 B2 | 2/2013 | Grunert et al. |

(Continued)

FOREIGN PATENT DOCUMENTS

| | | |
|---|---|---|
| EP | 3 718 983 A1 | 10/2020 |
| JP | 2011-510893 A | 4/2011 |

(Continued)

OTHER PUBLICATIONS

International Searching Authority, "International Search Report," issued in connection with International Patent Application No. PCT/JP2019/021128, dated Aug. 27, 2019.

(Continued)

*Primary Examiner* — Hung D Nguyen
(74) *Attorney, Agent, or Firm* — Foley & Lardner LLP

(57) ABSTRACT

The present invention relates to a laminated glass for a vehicle, the laminated glass having an intermediate film between an outer glass plate and an inner glass plate, includes: a test area A defined by JIS Standard R3212; an information transmitting/receiving area in which a device installed in a vehicle transmits and/or receives information; a film capable of heating the information transmitting/receiving area, the film being adhered to an area that is outside of the test area A and overlaps the information transmitting/receiving area in a planar view between the intermediate film and either one of the outer glass plate or the inner glass plate.

13 Claims, 13 Drawing Sheets

(52) U.S. Cl.
CPC .. *B32B 17/10229* (2013.01); *B32B 17/10293* (2013.01); *B32B 17/10348* (2013.01); *B32B 17/10385* (2013.01); *B32B 17/10761* (2013.01); *B60J 1/002* (2013.01); *C09J 133/04* (2013.01); *H05B 3/06* (2013.01); *H05B 3/141* (2013.01); *H05B 3/86* (2013.01); *B32B 2307/202* (2013.01); *B32B 2605/00* (2013.01); *H05B 2203/013* (2013.01); *H05B 2203/016* (2013.01)

(58) Field of Classification Search
CPC ........ B32B 17/10293; B32B 17/10348; B32B 17/10385; B32B 17/10761; B32B 2307/202; B32B 2605/00; B27B 7/12; H05B 3/06; H05B 3/141; H05B 3/86; H05B 2203/013; H05B 2203/106; B60J 1/002; C09J 133/04
See application file for complete search history.

(56) References Cited

U.S. PATENT DOCUMENTS

| | | | |
|---|---|---|---|
| 8,907,250 B2 | 12/2014 | Bressand et al. | |
| 2010/0096604 A1* | 4/2010 | Hayes | B32B 27/32 252/589 |
| 2013/0113664 A1* | 5/2013 | Kobayashi | H01Q 1/3291 343/711 |
| 2013/0128342 A1* | 5/2013 | Mitarai | B32B 17/10633 359/359 |
| 2013/0188237 A1* | 7/2013 | Lynam | G02B 27/0006 359/265 |
| 2017/0036646 A1* | 2/2017 | Kagaya | H05B 3/84 |
| 2017/0190151 A1* | 7/2017 | Hamano | B32B 17/10788 |

FOREIGN PATENT DOCUMENTS

| | | |
|---|---|---|
| JP | 2012-530646 A | 12/2012 |
| JP | 6065221 B2 | 1/2017 |
| JP | 2017-071544 A | 4/2017 |
| JP | 2017214059 A * | 12/2017 |
| JP | 2019-099405 A | 6/2019 |

OTHER PUBLICATIONS

International Searching Authority, "Written Opinion," issued in connection with International Patent Application No. PCT/JP2019/021128, dated Aug. 27, 2019.

* cited by examiner

LAMINATED GLASS

CROSS-REFERENCE TO RELATED APPLICATIONS

This U.S. non-provisional application is a continuation application of and claims the benefit of priority under 35 U.S.C. § 365(c) from PCT International Application PCT/JP2019/021128 filed on May 28, 2019, which is designated the U.S., and is based upon and claims the benefit of priority of Japanese Patent Applications No. 2018-103406 filed on May 30, 2018, the entire contents of which are incorporated herein by reference.

TECHNICAL FIELD

The present invention relates to a laminated glass.

BACKGROUND OF THE INVENTION

In recent years, for the purpose of improving vehicle safety, vehicles with the ability to automatically avoid collisions with vehicles travelling traveling ahead and pedestrians have been developed. For example, for such a vehicle, a device such as a camera is mounted in the vehicle to transmit and receive information such as road conditions via vehicle glass (e.g., windshield or the like) (see, for example, Patent Document 1).

In cold climates, however, the freezing of moisture adhering to the glass and the fogging of the glass caused by the difference in temperature between the inside and outside of the car may cause the loss of the function of these devices. Accordingly, in order to avoid this drawback, a technique has been proposed in which a heating film is applied to an area where a device placed on the interior side of the glass in a vehicle is provided (see, for example, Patent Document 2).

RELATED-ART DOCUMENT

Patent Documents

Patent Document 1: Japanese Unexamined Patent Application Publication (Translation of PCT Application) No. 2011-510893
Patent Document 2: Japanese Unexamined Patent Application Publication (Translation of PCT Application) No. 2012-530646

SUMMARY OF THE INVENTION

Problems to be Solved by the Invention

However, in order to uniformly heat a film, it is preferable that the planar shape of the film is rectangular. However, when a film is applied to an area where a device is placed on the interior side of the vehicle, interference with other components constrains the shape of the film and makes it difficult to form the film in the desired shape. If the shape of the film is non-rectangular, the film cannot be uniformly heated, and the sensing performance of the device is impaired due to freezing or fogging of the glass.

The present invention has been made in view of the above-described points, and an object of the present invention is to provide glass for a vehicle in which the sensing performance of a device is not easily impaired due to freezing, fogging, or the like.

Means for Solving the Problem

The present invention provides a laminated glass for a vehicle, the laminated glass having an intermediate film between an outer glass plate and an inner glass plate, includes: a test area A defined by JIS Standard R3212; an information transmitting/receiving area in which a device installed in a vehicle transmits and/or receives information; a film capable of heating the information transmitting/receiving area, the film being adhered to an area that is outside of the test area A and overlaps the information transmitting/receiving area in a planar view between the intermediate film and either one of the outer glass plate or the inner glass plate.

Effect of the Invention

According to a disclosure of the present invention, the glass for a vehicle in which the sensing performance of the device is not easily impaired by freezing, fogging or the like can be provided.

DETAILED DESCRIPTION OF THE INVENTION

Figure 1A:
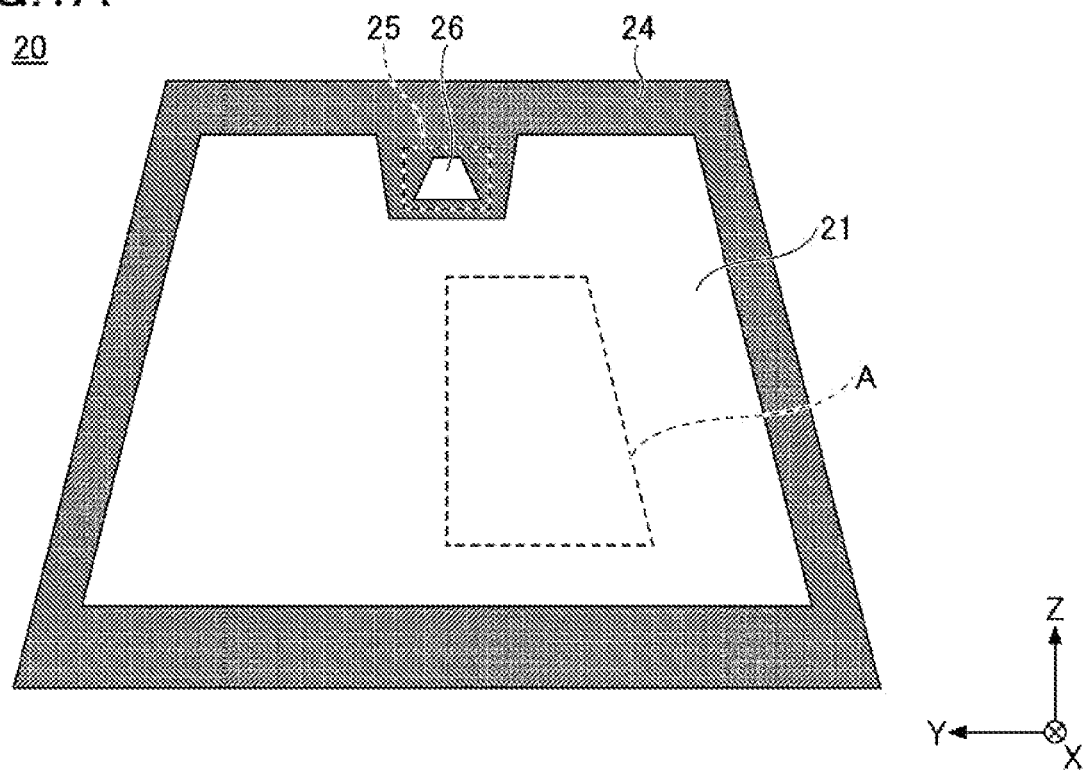
FIG. 1A is a diagram illustrating a windshield for a vehicle according to a first embodiment.

Hereinafter, embodiments for carrying out the invention with reference to the drawings will be described. In each drawing, the same components are indicated by the same reference numerals and overlapping descriptions may be omitted. In each drawing, the size and shape may be partially exaggerated to facilitate understanding of the subject matter of the invention.

Hereinafter, the windshield for a vehicle will be described by way of example, but the windshield is not limited thereto. The glass according to the embodiments is applicable to applications other than the windshield for a vehicle. Also, although the term vehicle particularly refers to an automobile, the term also refers a mobile unit that has glass such as a train, ship, an aircraft, and the like.

A planar view refers to viewing a predetermined area of a windshield from the normal direction of the predetermined area, and a planar shape refers to viewing a predetermined area of a windshield from the normal direction of the predetermined area. In the specification, the top and bottom refer to the Z-axis direction of the drawings, and the left and right refer to the Y-axis direction of the drawings.

First Embodiment

Figure 1B:
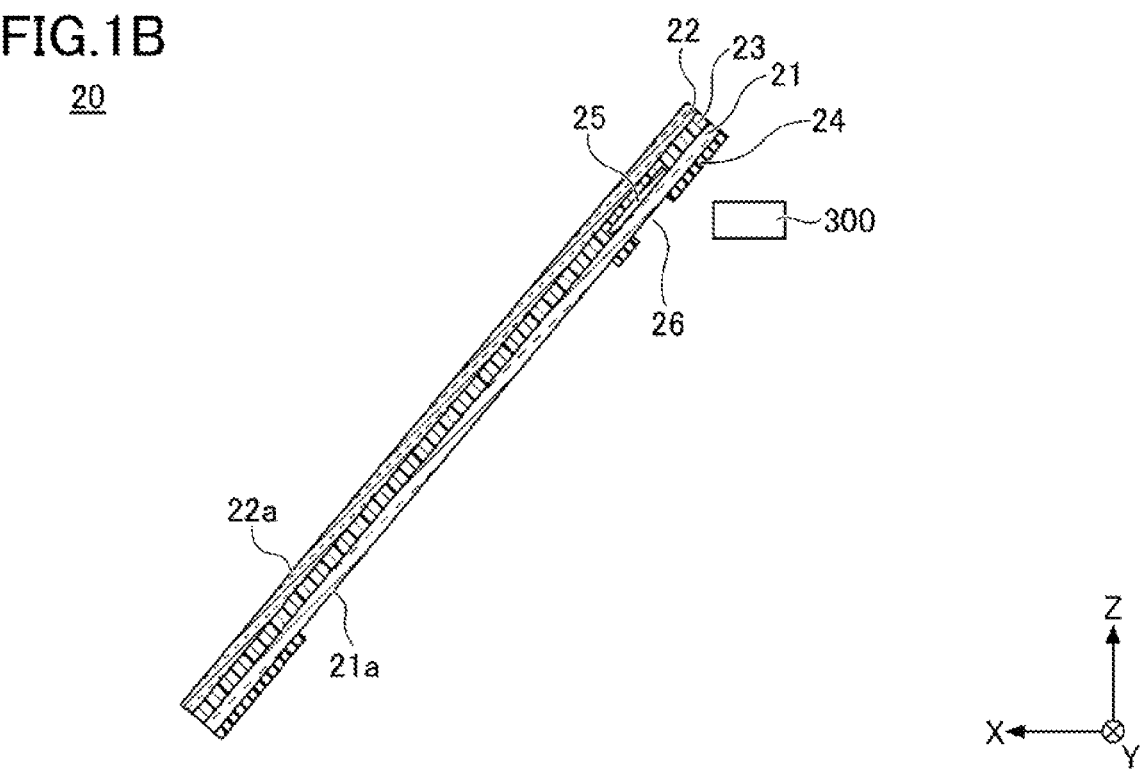
FIG. 1B is a diagram illustrating a windshield for a vehicle according to a first embodiment.

FIGS. 1A and 1B are diagrams illustrating a windshield for a vehicle according to the first embodiment. FIG. 1A is a schematic diagram illustrating a view of a windshield viewed from inside to outside of a vehicle (wherein the windshield 20 is mounted to a vehicle in an upward direction in the Z direction). FIG. 1B is a cross-sectional view of the windshield 20 shown in FIG. 1A cut in the XZ direction as viewed from the Y direction. Although FIG. 1B illustrates the device 300 with the windshield 20 for convenience, the device 300 is not a component of the windshield 20.

As illustrated in FIGS. 1A and 1B, the windshield 20 is a sheet of vehicle glass and has a glass plate 21 as the vehicle-interior side, a glass plate 22 as the vehicle-exterior side, an intermediate film 23, a shielding layer 24 and a film 25.

In the windshield 20, the glass plate 21 and the glass plate 22 are clamped together with the intermediate film 23 and the film 25. The intermediate film 23 may be formed from multiple layers of the intermediate film. Details of the glass plate 21, the glass plate 22, and the intermediate film 23 will be described later.

The shielding layer 24 is provided at the periphery of the vehicle-interior side surface 21a on the glass plate 21. The shielding layer 24 is an opaque layer and can be formed, for example, by applying a predetermined color of printing ink to the glass surface and burning the ink to the glass surface. The shielding layer 24 is, for example, an opaque (e.g., black) colored ceramic layer. The presence of the opaque shielding layer 24 at the periphery of the windshield 20 prevents ultraviolet-ray deterioration of resin, such as urethane, holding the periphery of the windshield 20 in the body or an adhesive member affixing a bracket to the (front) windshield 20. The bracket is for securing the device 300.

The windshield 20 has a test area A defined by JIS Standard R3212. The windshield 20 also defines an information transmitting/receiving area 26. The test area A is positioned inside an area surrounded by the shielding layer 24 in a planar view, and the information transmitting/receiving area 26 is positioned within an opening in the shielding layer 24.

The information transmitting/receiving area 26 functions as the area via which the device 300 transmits and/or receives information when the device 300 is placed on the upper peripheral edge of the windshield 20 in the vehicle. The planar shape of the information transmitting/receiving area 26 is not particularly limited, but is, for example, an isosceles trapezoid. The information transmitting/receiving area 26 is preferably located above the test area A because it does not interfere with the operator's view when the windshield 20 is mounted on the vehicle and it is advantageous for transmitting and/or receiving information.

The device 300 is a device that transmits and/or receives information. Examples of the device 300 include a camera that acquires visible light or infrared light, a millimeter wave radar, an infrared laser, and the like. In addition to the device 300, other devices may be positioned in the vehicle to transmit and/or receive information via the information transmitting/receiving area 26. Here, "signal" refers to electromagnetic waves including millimeter waves, visible light, infrared light, or the like.

The film 25 is a film capable of heating the information transmitting/receiving area 26. The the film 25 is adhered to an area that is outside of the test area A and overlaps the information transmitting/receiving area 26 in a planar view between the glass plate 22 and the intermediate film 23. Although it is preferable that the planar shape of the film 25 is a rectangle that is slightly larger than the planar shape of the information transmitting/receiving area, the planar shape of the information transmitting/receiving area 26 may be a trapezoidal shape, a rectangle or any side of the trapezoidal shape may be a curved shape, or any other shape.

A visible light transmittance Tv of the information transmitting/receiving area 26 including the film 25 is preferably 70% or more. The haze of the information transmitting/receiving area 26 including the film 25 is preferably 1% or less.

Figure 2A:
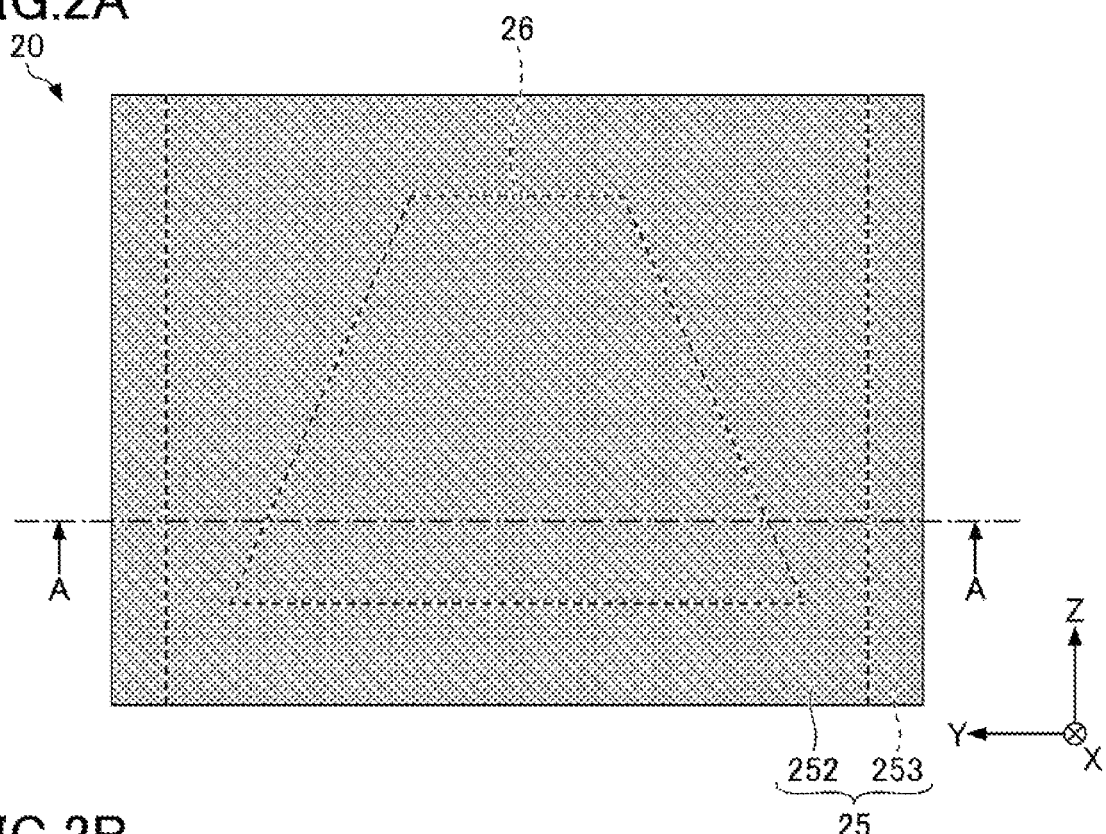
FIG. 2A is a diagram illustrating a film according to the first embodiment.
Figure 2B:
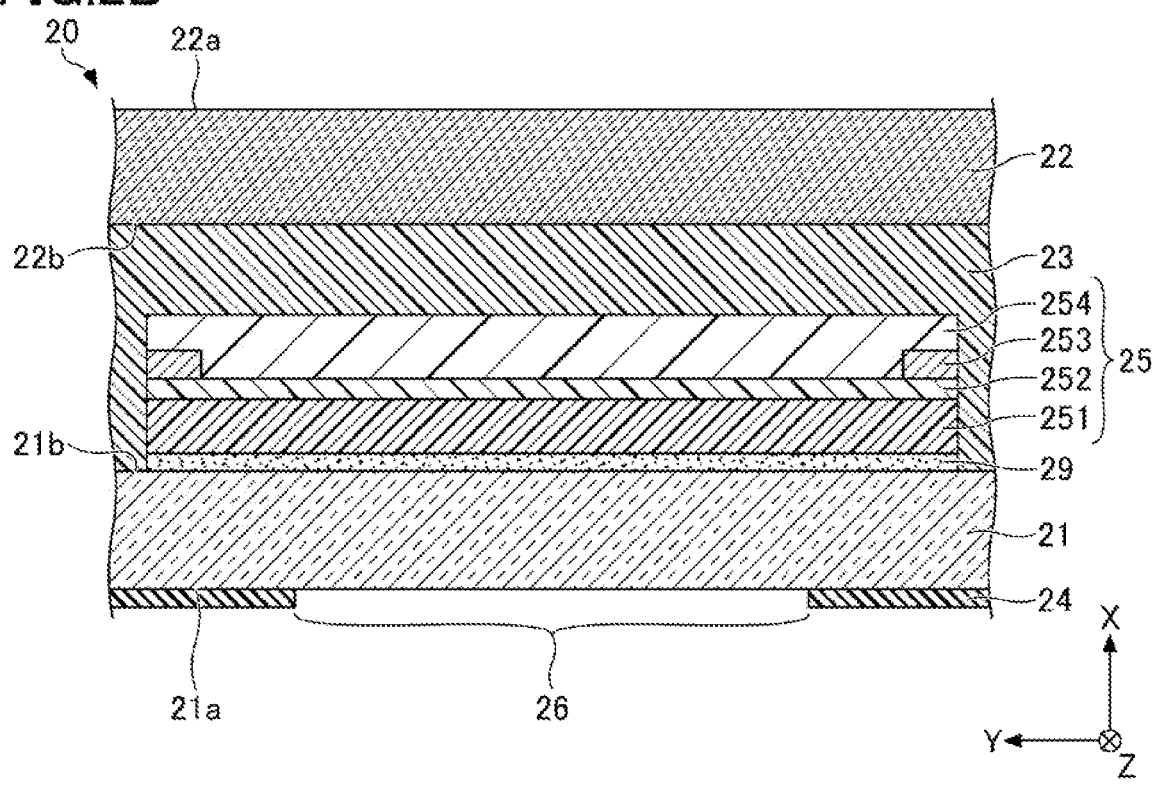
FIG. 2B is a diagram illustrating a film according to the first embodiment.

FIGS. 2A and 2B are diagrams illustrating a film according to the first embodiment. FIG. 2A is a schematic planar view illustrating a view of the film viewed from inside to outside of the vehicle cabin. FIG. 2B is a cross-sectional view along line A-A of FIG. 2A. In FIG. 2A, the glass plates 21 and 22, the intermediate film 23, the shielding layer 24, the adhesive layer 29, the substrate 251 and the protective film 254 are not shown. In FIG. 2A, for convenience, the information transmitting/receiving area 26 is shown as a dashed line.

The film 25 includes a substrate 251, a heating element 252, a busbar 253, and a protective film 254. The protective film 254, however, is not an essential component of the film 25 and thus may be provided as needed.

The film 25 is adhered to the glass plate 21 via an adhesive layer 29. More specifically, the vehicle-interior side surface of the substrate 251 in the film 25 is adhered via an adhesive layer 29 to the vehicle-exterior side surface 21b of the glass plate 21 located within the information transmitting/receiving area 26 and to the vehicle-exterior side surface 21b of the glass plate 21 adjacent the periphery of the information transmitting/receiving area 26.

The adhesive layer 29 can be formed from at least one resin selected from the group, for example, consisting of an acrylic, acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, and polyvinyl butyral.

The adhesive layer 29 preferably has an adhesion force of 10 N/25 mm or more to the glass plate 21 by the 180 deg peel test at a tensile speed of 300 mm/min. If the adhesive layer 29 has an adhesive force of 10 N/25 mm or more with the glass plate 21 by the 180 deg peel test at a tensile speed of 300 mm/min, the broken glass can be prevented from coming off even when the windshield 20 is broken.

The thickness of the adhesive layer 29 is, for example, 5 µm or more and 120 µm or less. When the thickness of the adhesive layer 29 is 5 µm or more, the adhesive layer 29 mitigates the thermal shrinkability difference between the glass plate 21 and the film 25 during crimping when preparing the laminated glass. As a result, the smoothness of the inner side surface and outer side surfaces of the film 25 is maintained, and the sensing performance of the device 300 is ensured. Further, if the thickness of the adhesive layer 29 is 5 µm or more, the edge degradation of the adhesive layer 29 can be prevented from being deteriorated when the adhesive layer 29 is repeatedly used in the high-temperature and high-humidity environment.

Further, when the thickness of the adhesive layer 29 is 120 µm or less, the inner and outer side surfaces of the film 25 follow the vehicle-exterior side surface 21b of the glass plate 21 which is a smooth surface. Thus, the smoothness of the inner and outer side surfaces of the film 25 can be maintained to ensure the sensing performance of the device 300.

For example, a plastic film or glass may be used as the substrate 251. The thickness of the substrate 251 may be 5 µm or more and 500 µm or less, but preferably 10 µm or more and 200 µm or less, and more preferably 50 µm or more and 150 µm or less.

The plastic film forming substrate 251 can be formed from a homopolymer or copolymer of at least one monomer selected from the group consisting of, for example, polyester (e.g., polyethylene terephthalate, polyethylene naphthalate, etc.), polyamide, polyether, polysulfone, polyether sulfone, polycarbonate, polyarylate, polyetherimide, polyether ether ketone, polyimide, aramid, polybutylene terephthalate, polyvinyl butyral, and polyvinyl acetate. Examples of the material of the glass that forms the substrate 251 include inorganic glass such as soda lime glass, alumino silicate, and the like or organic glass and the like.

The heating element 252 is formed on the substrate 251. The heating element 252 can be formed from a conductive thin film such as, for example, gold, silver, copper, or tin-doped indium oxide. The heating element 252 can be formed using, for example, a physical vapor deposition (PVD), such as a sputtering method, a vacuum deposition method or an ion plating method. The heating element 252 may be formed using a chemical vapor deposition (CVD) or wet coating method. The sheet resistance of the heating element 252 is preferably 150 Ω/squared or less.

A pair of busbars 253 extend along the ends of substrate 251 and are electrically connected to heating element 252. One pole of the pair of busbars 253 is, for example, a positive pole and is connected to the positive side of a power supply, such as a battery mounted in a vehicle, via a lead wire or the like. The other pole of the pair of busbars 253 is also, for example, a negative pole which is connected to the negative side of a power supply such as a battery mounted in a vehicle via a lead wire or the like.

When a current is supplied to the heating element 252 from a power source, such as a battery, through a pair of busbars 253, the heating element 252 generates heat. Heat generated by the heating element 252 warms the information transmitting/receiving area 26 of the windshield 20, removes freezing and fogging of the surfaces of the glass plates 21 and 22 constituting the information transmitting/receiving area 26, and ensures good sensing by the device 300.

A non-contact power supply may be used for supplying power to the heating element 252. A non-contact power supply is away of supplying power wirelessly without physical contact by connectors, wiring or the like. For non-contact power supply, for example, an electromagnetic induction system that supplies power by electromagnetic induction while the coils provided in each of the non-contact power supplying units and the power receiving unit are in close proximity to each other can be used.

As the busbar 253, silver paste is preferably used. The silver paste may be applied, for example, by a printing process such as screen printing. The busbar 253 may be formed of (i) at least one metal selected from the group consisting of silver, copper, tin, gold, aluminum, iron, tungsten, and chromium, (ii) an alloy containing two or more metals selected from the group, or (iii) a conductive organic polymer, such as by sputtering. A copper ribbon or flat knitted copper wire may also be used as the busbar 253.

The protective film 254 is a film that protects the heating element 252 and the busbar 253. Examples of the material of the protective film 254 are polyethylene terephthalate and the like.

In FIGS. 1B and 2B, the shielding layer 24 is provided on the vehicle-interior side surface 21a in the glass plate 21, but is not limited thereto. The shielding layer 24 may be provided, for example, on the vehicle-interior side surface 22b in the glass plate 22 or on both the vehicle-interior side surface 21a in the glass plate 21 and the vehicle-interior side surface 22b in the glass plate 22.

In the case where the shielding layer 24 is provided on the vehicle-interior side surface 22b in the glass plate 22, it is preferable that the edge of the shielding layer 24 overlap the edge of the film 25 by 1 mm or more in a planar view from the viewpoint of reducing the concealment and the fluoroscopic distortion of the edge. Also, a layer may be provided on the film 25 itself to conceal the edges of the film 25 (e.g., coloring the periphery of the film 25).

Here, the glass plate 21, the glass plate 22 and the intermediate film 23 will be described in detail.

In the windshield 20, the vehicle-interior side surface 21a in the glass plate 21 (the inner surface of the windshield 20) and the vehicle-exterior side surface 22a in the glass plate 22 (the outer surface of the windshield 20) may be flat or curved surfaces.

For example, inorganic glass such as soda lime glass, alumino silicate, organic glass, and the like may be used as the glass plates 21 and 22. When the glass plates 21 and 22 are inorganic glass, they can be produced, for example, by a float process.

The thickness of the glass plate 22 located outer side of windshield 20 is preferably 1.8 mm or more and 3 mm or less in the thinnest portion of the glass plate. When the thickness of the glass plate 22 is 1.8 mm or more, the strength of the resistance to windshield chipping and cracking or the like is sufficient. When the thickness is 3 mm or less, the mass of the laminated glass is not too large, and it is preferable in terms of the fuel economy of the vehicle. The thickness of the glass plate 22 is more preferably 1.8 mm or more and 2.8 mm or less, and further preferably 1.8 mm or more and 2.6 mm or less.

The thickness of the glass plate 21 located inner side of the windshield 20 is preferably 0.3 mm or more and 2.3 mm or less. When the thickness of the glass plate 21 is 0.3 mm or more, the glass plate 21 is easy to handle. When the thickness is 2.3 mm or less, the mass of the windshield 20 is not too large.

When the thickness of the glass plate 21 is 0.3 mm or more and 2.3 mm or less, the glass quality (for example, residual stress) can be maintained. A plate thickness of 0.3 mm or more and 2.3 mm or less of the glass plate 21 is particularly effective for maintaining glass quality (e.g., residual stress) in deeply curved glass. The thickness of the glass plate 21 is more preferably 0.5 mm or more and 2.1 mm or less, and further preferably 0.7 mm or more and 1.9 mm or less.

However, the thickness of the glass plates 21 and 22 is not always constant and may vary from place to place as necessary. For example, one or both of the glass plates 21 and 22 may include a wedge-like area with a thicker vertical top thickness than the bottom when the windshield 20 is mounted to the vehicle.

When the windshield 20 is curved, then the glass plates 21 and 22 are bent and molded, such as by a float process, prior to adhesion by the intermediate film 23. Bending is accomplished by softening the glass by heating. The temperature at which the glass is heated during bending and molding is approximately 550° C. to 700° C.

Thermoplastic resins are frequently used as the intermediate film 23 for bonding the glass plate 21 to the glass plate 22. For example, thermoplastic resins which have been used for such applications as plasticized polyvinyl acetal resins, plasticized polyvinyl chloride resins, saturated polyester-based resins, plasticized saturated polyester-based resins, polyurethane-based resins, plasticized polyurethane-based resins, ethylene-vinyl acetate copolymer-based resins, ethylene-ethyl acrylate copolymer-based resins and the like. Resin compositions containing modified block copolymer hydrides as described in Japanese Patent No. 6065221 can also be suitably employed.

Among these, plasticized polyvinyl acetal resin is preferably used because it has excellent balance of various performance properties such as transparency, weather resistance, strength, adhesion, penetration resistance, shock energy absorption, moisture resistance, thermal insulation, sound insulation and the like. These thermoplastics may be used alone or in combination with two or more types. "Plasticization" in the above-described plasticized polyvinyl acetal resin refers plasticized by the addition of a plasticizer. The same applies to other plasticized resins.

The above-described polyvinyl acetal-based resin includes a polyvinyl formal resin obtained by reacting a polyvinyl alcohol (hereinafter, sometimes referred to as "PVA" as necessary) with formaldehyde, a narrowly defined polyvinyl acetal resin obtained by reacting a PVA with acetaldehyde, and a polyvinyl butyral resin obtained by reacting a PVA with n-butyraldehyde (hereinafter, sometimes referred to as "PVB" as necessary). In particular, the PVB is considered to be suitable because it has excellent balance of various performance characteristics such as transparency, weather resistance, strength, adhesion, permeability, impact energy absorption, moisture resistance, heat insulation, sound insulation and the like. These polyvinyl acetal resins may be used alone or two or more types of these polyvinyl acetal resins may be used together. However, the material forming the intermediate film 23 is not limited to the thermoplastic resin. The thickness of the intermediate film 23 is preferably 0.5 mm or more in the thinnest portion of the glass plate. When the thickness of the intermediate film 23 is 0.5 mm or more, the necessary penetration resistance as a windshield is sufficient. In addition, it is preferable that the thickness of the intermediate film 23 is 3 mm or less at the thickest portion. If the maximum thickness of the intermediate film 23 is 3 mm or less, the mass of the laminated glass does not increase too much. The maximum value of the intermediate film 23 is more preferably 2.8 mm or less, and further preferably 2.6 mm or less.

The intermediate film 23 may have three or more layers. For example, the intermediate film is constituted by three layers, and the hardness of the middle layer is lowered below the hardness of the other two by adjusting the plasticizer, etc., thereby improving the sound insulation performance of the laminated glass. In this case, the hardness of the other two layers may be the same or different.

In order to fabricate the intermediate film 23, for example, the above-described resin material that is the intermediate film is appropriately selected. The intermediate film is extruded and molded in a heated melt state using an extruder. Then, the extrusion conditions such as extrusion speed of the extruder is set to be uniform. Thereafter, the intermediate film 23 is completed by extending the extruded resin film, for example, as needed, in order to provide curvature to the upper and lower sides of the windshield 20 in accordance with the design of the windshield 20.

The intermediate film 23, the film 25 and the adhesive layer 29 (the adhesive layer 29 is preliminary provided on one side of the film 25) are sandwiched between the glass plate 21 and the glass plate 22 to produce a laminated glass. The laminate is placed into a rubber bag, for example, and bonded at a temperature of about 70 to 110° C. in a vacuum of −100 to −65 kPa.

Further, the durability of the laminated glass can be further improved by performing a compression bonding of heating and pressing at, for example, 100 to 150° C., a pressure of 0.6 to 1.3 MPa. However, this heating and pressurizing process may not be used in some cases, taking into consideration the simplification of the process and the properties of the materials enclosed in laminated glass.

In addition to the intermediate film 23 and the film 25, a film or device having functions such as infrared reflection, luminescence, dimming, visible light reflection, scattering, decoration, absorption or the like may be provided between the glass plate 21 and the glass plate 22, to the extent that the effect of the present invention is not impaired.

Thus, the windshield 20 encloses the film 25, as opposed to the case where the film is applied to the area where the device is provided on the vehicle-interior side of the glass. This eliminates the possibility that the film 25 interferes with other components (e.g., brackets for the device 300) and improves the degree of design flexibility of the planar shape of the film 25. As a result, the planar shape of the film 25 can easily be provided in a desired shape (e.g., rectangular).

For example, the planar shape of the film 25 may be rectangular, and a pair of busbars 253 may be placed parallel to both ends of the rectangular film 25. This allows a uniform current flow across the film 25 more easily than when the shape of the film 25 is non-rectangular, thereby allowing the film 25 to heat uniformly. As a result, the windshield 20 that is unlikely to impair the sensing performance of the device 300 due to freezing, fogging or the like, can be achieved.

Also, the windshield 20 encloses the film 25 within the windshield 20. Therefore, the risk of damage to the film 25 can be reduced.

The windshield 20 encloses the film 25 within the windshield 20. Therefore, the crack propagation can be suppressed when the windshield 20 is cracked.

When the film 25 is enclosed in the windshield 20, the film 25 may be sandwiched between two intermediate films, but this configuration is not preferred. When two intermediate films are used, each of the intermediate films has a thickness of several 100 μm, so that the film 25 cannot follow the vehicle-exterior side surface 21b in the glass plate 21 and the vehicle-interior side surface 22b in the glass plate 22 which are smooth surfaces. As a result, the film 25 is wrinkled, the smoothness of the inner and outer surfaces of the film 25 is lowered, and the sensing performance of the device 300 is impaired.

In contrast, in the windshield 20, the thickness of the adhesive layer 29 is 120 µm or less. Therefore, the film 25 follows the vehicle-exterior side surface 21*b* in the glass plate 21 which has smooth surfaces. Thus, the smoothness of the inner and outer surfaces of the film 25 can be maintained to ensure the sensing performance of the device 300. Also, since the thickness of the adhesive layer 29 is 120 µm or less in the windshield 20, the temperature of the vehicle-interior side surface 21*a* in the glass plate 21 within the information transmitting/receiving area 26 can be increased.

First Modification of the First Embodiment

A first modification of the first embodiment shows an example in which an adhesive layer is also provided between the film and the intermediate film. In the first modification of the first embodiment, the description of the same configuration portion as the embodiment described previously may be omitted.

Figure 3:
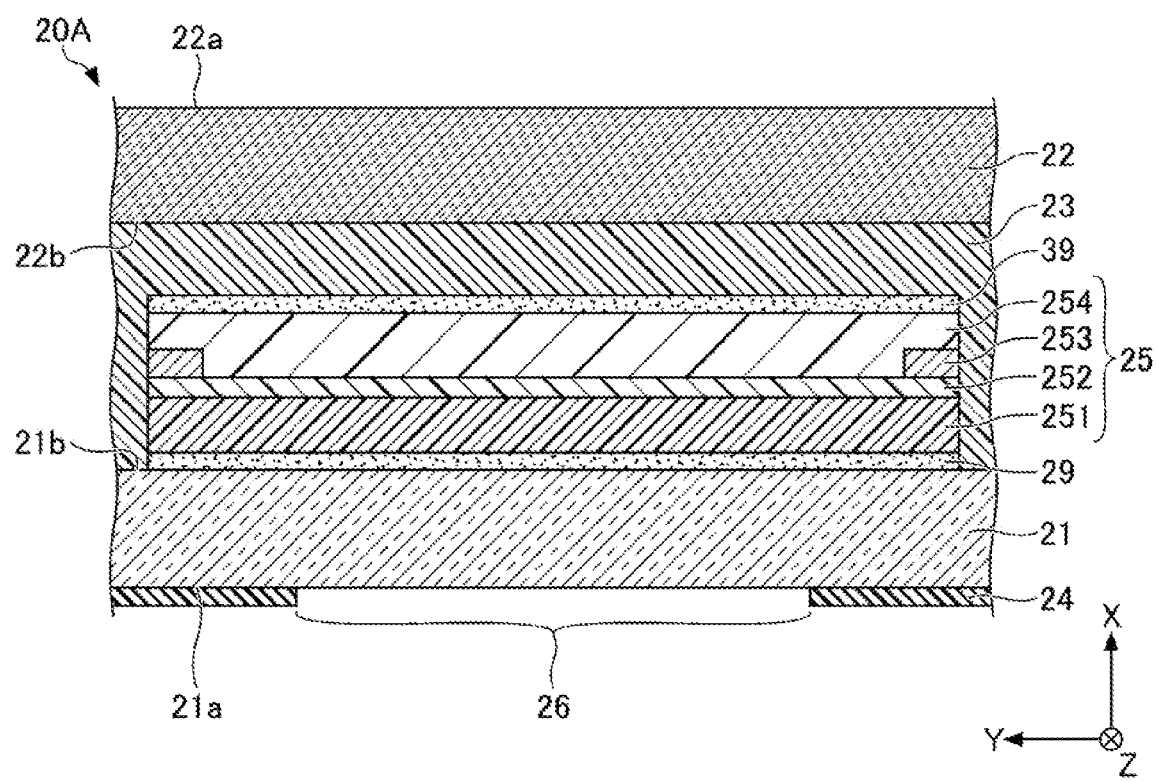
FIG. 3 is a cross-sectional view illustrating a film according to a first modification of the first embodiment.

FIG. 3 is a cross-sectional view illustrating a film according to the first modification of the first embodiment, and shows a cross-section corresponding to FIG. 2B. Further, according to the first modification of the first embodiment, the entire planar shape and the cross-sectional shape of the windshield 20A are the same as in FIGS. 1A and 1B.

The windshield 20A shown in FIG. 3 differs from the windshield 20 (see FIG. 2B) in that an adhesive layer 39 is provided between the film 25 and the intermediate film 23.

In the windshield 20A, the inner side surface of a vehicle in the substrate 251 of the film 25 is adhered via an adhesive layer 29 to the vehicle-exterior side surface 21*b* in the glass plate 21 located within the information transmitting/receiving area 26 and to the vehicle-exterior side surface 21*b* of a vehicle in the glass plate 21 adjacent the periphery of the information transmitting/receiving area 26. Additionally, in windshield 20A, the outer side surface of a vehicle (opposite the surface in contact with heating element 252) in the protective film 254 of the film 25 is adhered to the inner side surface of a vehicle in the intermediate film 23 via the adhesive layer 39.

In the film 25, the protective film 254 and the intermediate film 23 may be difficult to adhere each other. In this case, as shown in FIG. 3, the adhesive layer 39 is preferably provided to adhere the outer side surface of a vehicle in the protective film 254 to the inner side surface of a vehicle in the intermediate film 23.

The material of the adhesive layer 39 may be suitably selected from the material exemplified as the material of the adhesive layer 29 in the first embodiment. The thickness of the adhesive layer 39 is, for example, 5 µm or more and 120 µm or less.

In this manner, the adhesive layer 39 may be provided to adhere the film 25 to the intermediate film 23. This improves the adhesion between the protective film 254 of the film 25 and the intermediate film 23.

Second Embodiment

The second embodiment shows that an adhesive layer and a film are provided between the vehicle-exterior glass plate and the intermediate film. In the second embodiment, the description of the same configuration portion as that of the embodiment described previously may be omitted.

Figure 4:
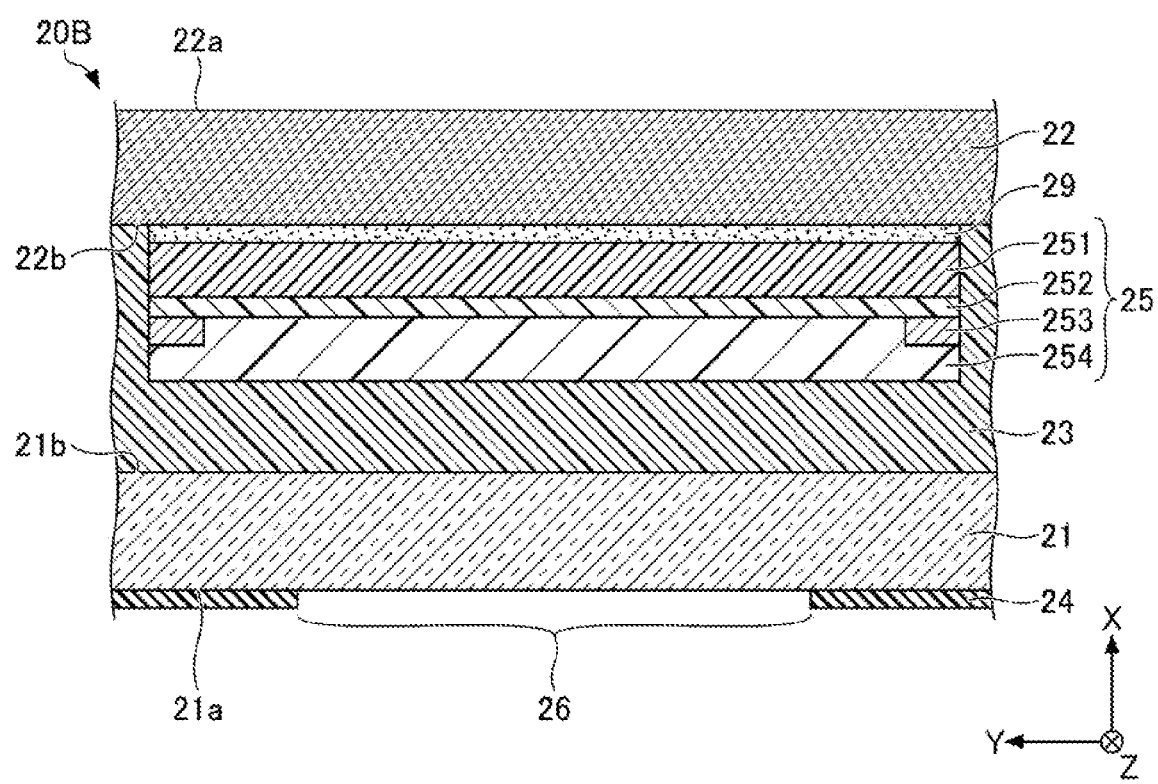
FIG. 4 is a cross-sectional view illustrating a film according to a second embodiment.

FIG. 4 is a cross-sectional view illustrating a film according to a second embodiment and shows a cross-section corresponding to FIG. 2B. The entire planar shape and cross-sectional shape of the windshield 20B according to the second embodiment are the same as in FIGS. 1A and 1B.

The windshield 20B illustrated in FIG. 4 differs from the windshield 20 (see FIG. 2B) in that the film 25 is secured to the vehicle-interior side surface 22*b* in the glass plate 22 via the adhesive layer 29. That is, in the windshield 20B, the film 25 is adhered to an area that is outside of the test area A and overlaps the information transmitting/receiving area 26 in a planar view between the glass plate 22 and the intermediate film 23.

In the windshield 20B, the outer side surface of a vehicle in the substrate 251 of the film 25 is adhered to the vehicle-interior side surface 22*b* in the glass plate 22 located in the information transmitting/receiving area 26 and the vehicle-interior side surface 22*b* in the glass plate 22 adjacent the periphery of the information transmitting/receiving area 26 via the adhesive layer 29.

In this manner, the film 25 may adhere to the vehicle-interior side surface 22*b* in the glass plate 22. In this case, the same effect as in the first embodiment is achieved.

First Modification of the Second Embodiment

In the first modification of the second embodiment, another example in which an adhesive layer is also provided between the film and the intermediate film is shown. In the first modification of the second embodiment, the description of the same configuration portion as that of the embodiment described previously may be omitted.

Figure 5:
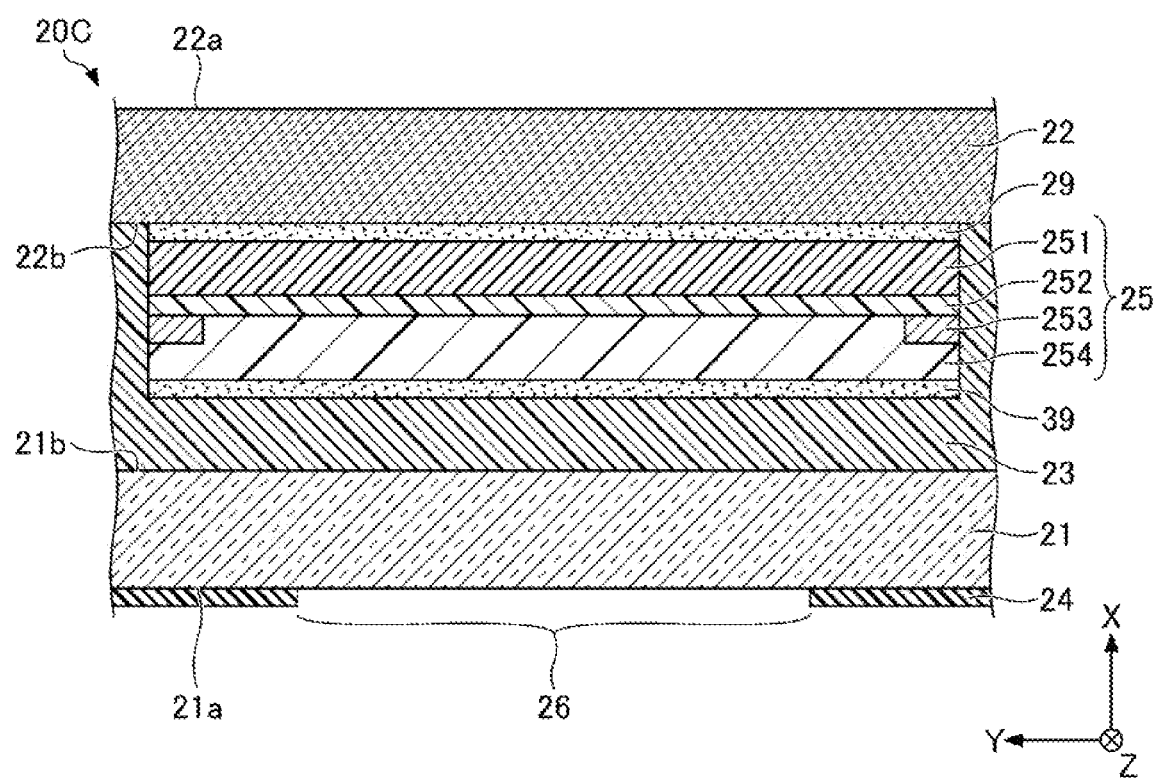
FIG. 5 is a cross-sectional view illustrating a film according to a first modification of a second embodiment.

FIG. 5 is a cross-sectional view illustrating a film according to the first modification of the second embodiment and shows a cross-section corresponding to FIG. 2B. The entire planar shape and the cross-sectional shape of the windshield 20C according to the first modification of the second embodiment are the same as in FIGS. 1A and 1B.

The windshield 20C illustrated in FIG. 5 differs from the windshield 20B (see FIG. 4) in that the adhesive layer 39 is provided between the film 25 and the intermediate film 23.

In the windshield 20C, the outer side surface of a vehicle in the substrate 251 of the film 25 is adhered to the vehicle-interior side surface 22*b* in the glass plate 22 located in the information transmitting/receiving area 26 and the vehicle-interior side surface 22*b* in the glass plate 22 adjacent the periphery of the information transmitting/receiving area 26 via the adhesive layer 29. Additionally, in windshield 20C, the vehicle-interior side surface (opposite the surface in contact with heating element 252) in the protective film 254 of the film 25 is adhered to the outer side surface of a vehicle in the intermediate film 23 via the adhesive layer 39.

In the film 25, the protective film 254 and the intermediate film 23 may be difficult to adhere each other. In this case, as illustrated in FIG. 5, the adhesive layer 39 is preferably provided to adhere the inner side surface of a vehicle in the protective film 254 to the outer side surface of a vehicle in the intermediate film 23.

The material of the adhesive layer 39 may be suitably selected from the material exemplified as the material of the adhesive layer 29 in the first embodiment. The thickness of the adhesive layer 39 is, for example, 5 µm or more and 120 µm or less.

In this manner, the adhesive layer 39 may be provided to adhere the film 25 to the intermediate film 23. This improves the adhesion between the protective film 254 of the film 25 and the intermediate film 23.

Third Embodiment

The third embodiment shows an example of providing a heating element that is different from the first or second embodiment. In the third embodiment, the description of the same configuration portion as that of the embodiment described previously may be omitted.

Figure 6:
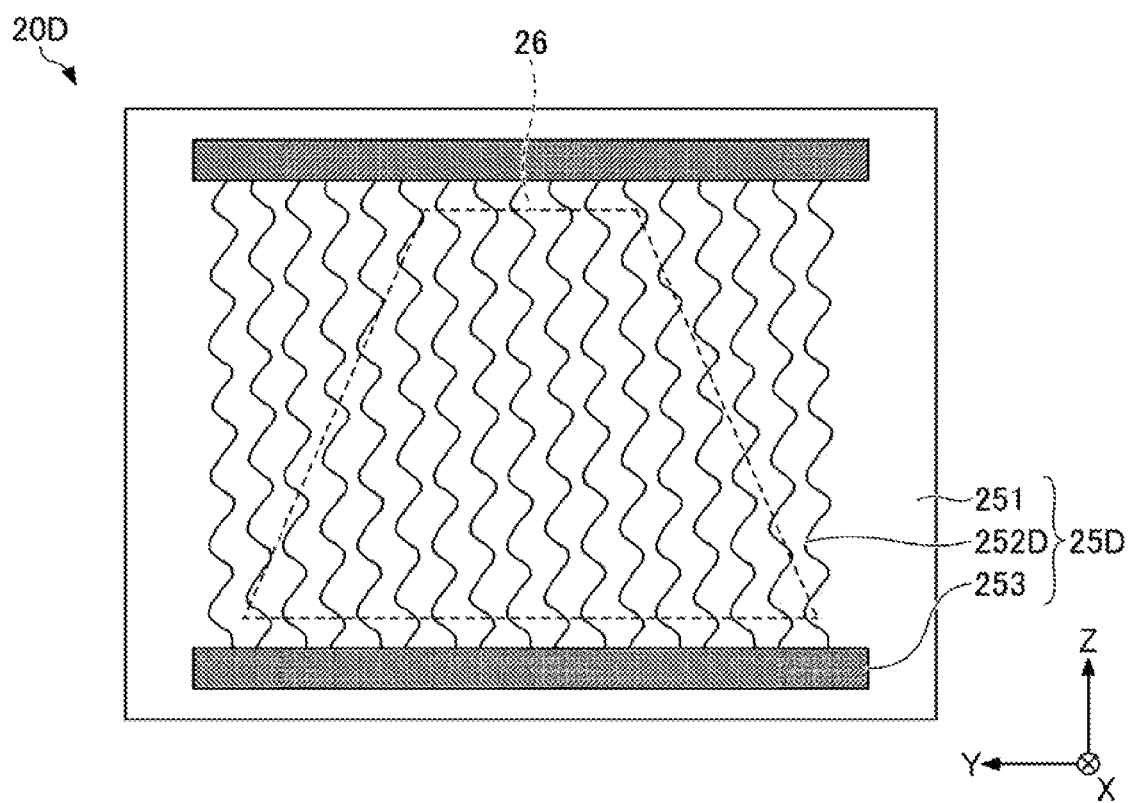
FIG. 6 is a planar view (First of two) illustrating a film according to a third embodiment.

FIG. 6 is a planar view (First of two) illustrating the film according to the third embodiment, and is a planar view schematically showing a view of the film viewed from inside to outside of a vehicle. In FIG. 6, the glass plates 21 and 22, the intermediate film 23, the shielding layer 24, the adhesive layer 29 and the protective film 254 are not shown. For convenience, the information transmitting/receiving area 26 is shown as a dashed line in FIG. 6. The entire planar and cross-sectional shape of the windshield 20D are the same as in FIGS. 1A and 1B.

The windshield 20D illustrated in FIG. 6 differs from windshield 20 (see FIGS. 2A and 2B) in that the film 25 has been replaced by a film 25D. Also, the film 25D differs from film 25 (see FIGS. 2A and 2B) in that the heating element 252 has been replaced by a heating element 252D.

The heating element 252D is an electric heat wire formed on the substrate 251. The heating element 252D may, for example, be configured such that a plurality of electric heat wires formed in a wavy or a broken line are arranged in a predetermined spacing and connected in parallel between a pair of opposing busbars 253. However, in the heating element 252D, a mesh-like metal may be used instead of an electric heat wire.

The heating element 252D is not particularly limited as long as the heating element 252D is formed of an electric heat wire or mesh-like metal material, which may be an electrically conductive material. Examples of the conductive material include (i) at least one metal selected from the group consisting of gold, silver, copper, aluminum, nickel, and tungsten, (ii) an alloy containing two or more metals selected from the group, and the like.

The wavelength or the period of the electric heat wire may be changed during the process from one pole to the other pole of the busbar 253. In addition, the adjacent electric heat wires may be in phase or out of phase on the way from one pole to the other pole of the busbar 253. If the adjacent electric heat wires are out of phase, it is preferable to suppress light formation due to regular scattering of light.

Figure 7:
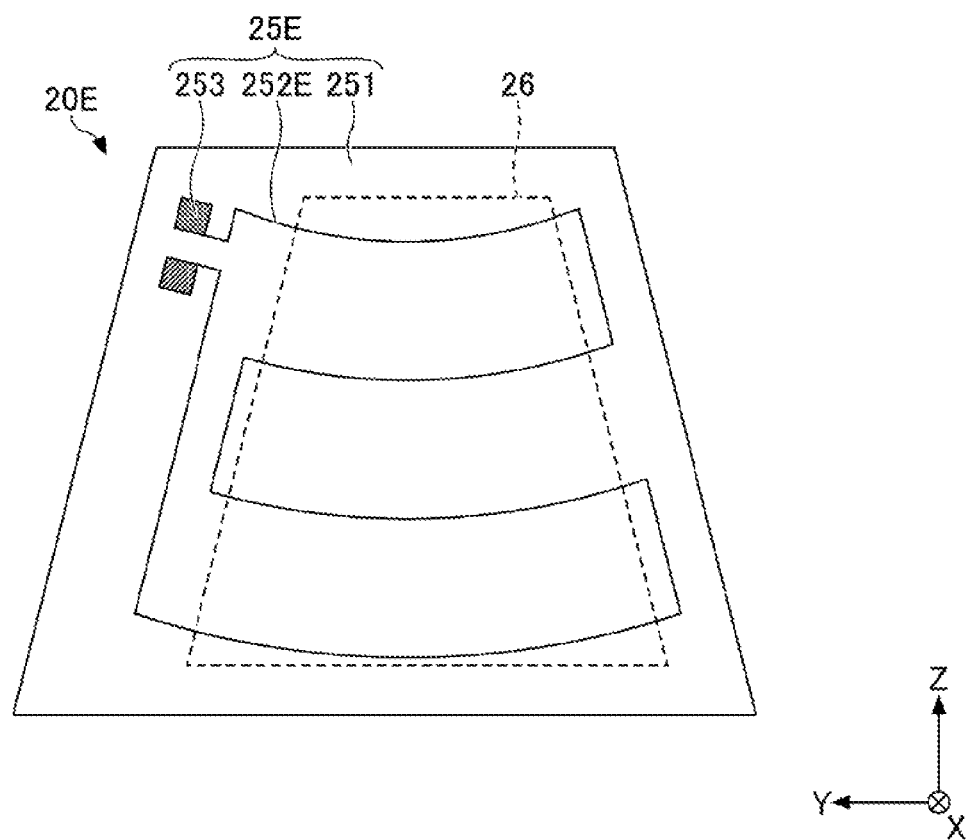
FIG. 7 is a planar view (Second of two) illustrating a film according to the third embodiment.

FIG. 7 is a planar view (Second of two) illustrating a film according to a third embodiment, and is a planar view schematically illustrating a view of the film viewed from inside to outside of a vehicle. In FIG. 7, the glass plates 21 and 22, the intermediate film 23, the shielding layer 24, the adhesive layer 29 and the protective film 254 are not shown. For convenience, the information transmitting/receiving area 26 is shown as a dashed line in FIG. 7. The entire planar and cross-sectional shape of the windshield 20E are the same as in FIGS. 1A and 1B.

The windshield 20E illustrated in FIG. 7 differs from the windshield 20 (see FIGS. 2A and 2B) in that the film 25 has been replaced by a film 25E. The film 25E also differs from the film 25 (see FIGS. 2A and 2B) in that the heating element 252 has been replaced by a heating element 252E.

In the film 25E, a pair of busbars 253 are placed near the corners of the film 25E. The heating element 252E is an electric heat wire formed on the substrate 251 and connected between a pair of busbars 253. Electric heat wire materials are as described above. The planar shape of the film 25E is an isosceles trapezoid, but may be a rectangular shape.

In this manner, the heating element may be formed from an electric heat wire or a mesh-like metal.

Fourth Embodiment

The fourth embodiment shows an example of providing a slit in the heating element. In the fourth embodiment, the description of the same configuration as the embodiment described above may be omitted.

Figure 8:
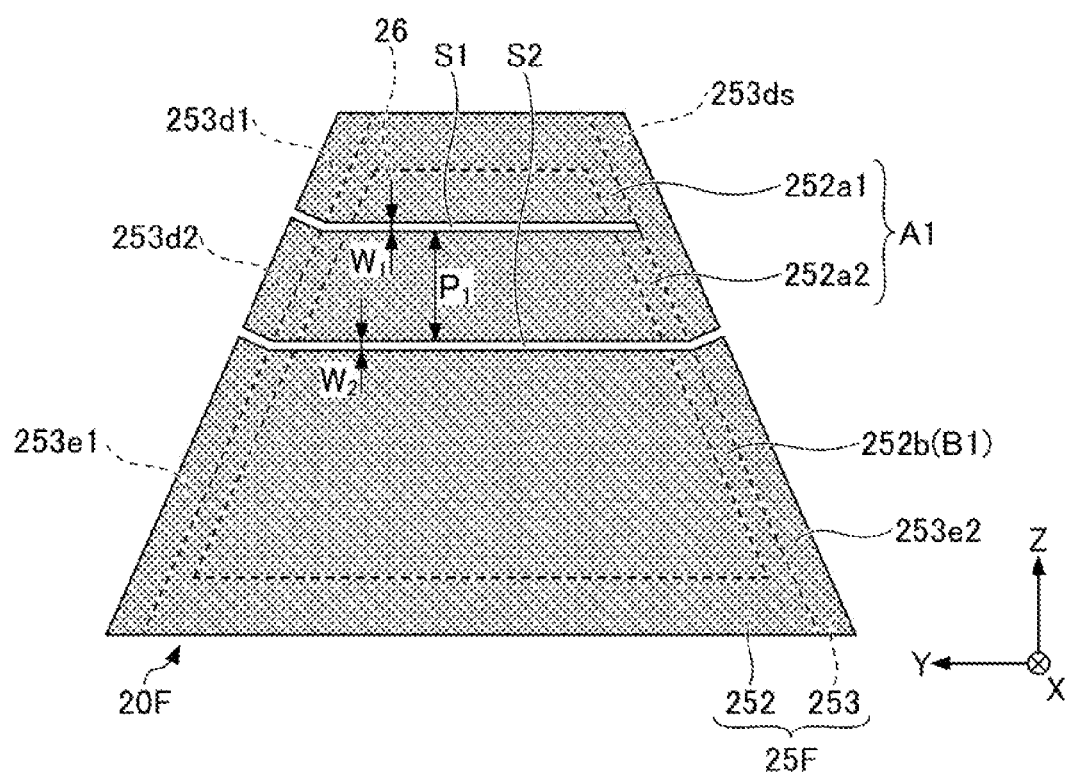
FIG. 8 is a planar view illustrating a film according to a fourth embodiment.

FIG. 8 is a planar view illustrating a film according to a fourth embodiment, and is a planar view schematically showing how the film is viewed from inside to outside of a vehicle. In FIG. 8, the glass plates 21 and 22, the intermediate film 23, the shielding layer 24, the adhesive layer 29, the substrate 251 and the protective film 254 are not shown. For convenience, the information transmitting/receiving area 26 is shown as a dashed line in FIG. 8. The entire planar and cross-sectional shape of the windshield 20F are the same as in FIGS. 1A and 1B.

The windshield 20F illustrated in FIG. 8 differs from the windshield 20 (see FIGS. 2A and 2B) in that the film 25 has been replaced by a film 25F. The film 25F differs from the film 25 (see FIGS. 2A and 2B) in that the slits S1 and S2 are provided in the heating element 252.

The heating element 252 is provided with two slits S1 and S2 extending in the Y direction (horizontal direction with windshield 20F attached to the vehicle). The heating element 252 is divided into three heating areas 252a1, 252a2, and 252b by the slits S1 and S2.

Slits S1 and S2 can be formed, for example, in an etching manner thereby partially removing the heating element 252 using an acid or the like. Slits S1 and S2 may be formed in a decoat manner thereby partially removing the heating element 252 using a laser or the like.

The width $W_1$ of the slit S1 and the width $W_2$ of the slit S2 are each preferably 0.3 mm or less, more preferably 0.2 mm or less and further preferably 0.1 mm or less. When the width $W_1$ of the slit S1 and the width $W_2$ of the slit S2 are each larger than 0.3 mm, the sensing performance of the device 300 is adversely affected. The width $W_1$ of the slit S1 and the width $W_2$ of the slit S2 are each 0.3 mm or less, so that the influence on the sensing performance of the device 300 can be reduced. By narrowing the width $W_1$ of the slit S1 and the width $W_2$ of the slit S2 to be each 0.2 mm or less, and further to be each 0.1 mm or less, the influence on the sensing performance of the device 300 can be further reduced.

In addition, the distance $P_1$ between the slit S1 and the slit S2 is preferably 10 mm or more. When the distance $P_1$ between the slit S1 and the slit S2 is less than 10 mm, the sensing performance of device 300 is adversely affected. However, when the distance $P_1$ is 10 mm or more, the effect on the sensing performance of device 300 can be reduced.

The busbar 253d1 is connected along one end of the heating area 252a1 and a busbar 253ds along the other end of the heating element 252. The busbar 253d2 is connected along one end of the heated area 252a2 and a busbar 253ds is connected along the other end. The busbar 253ds is shared by heated areas 252a1 and 252a2, and heating areas 252a1 and 252a2 are connected in series via the busbar 253ds. The first heating zone A1 is configured by the heating areas 252a1 and 252a2. Here, a heating zone is an area that is heated by energizing a set of busbars.

The busbar 253e1 is connected along the one end (first end) of the heating area 252b, and the busbar 253e2 is connected along the other end (second end) of the heating area 252b. A second heating zone B1 is formed by the heating area 252b.

The first heating zone A1 and the second heating zone B1 are connected in parallel. That is, the voltage applied between busbar 253d1 and busbar 253d2 is the same as the voltage applied between busbar 253e1 and busbar 253e2.

One side of the busbars 253d1 and 253d2 is a positive electrode and is connected to the positive side of a power supply such as a battery mounted in a vehicle through a lead wire or the like. The other side of the busbar 253d1 and the busbar 253d2 is a negative electrode and is connected to the negative side of a power supply such as a battery mounted in a vehicle via a lead wire or the like. This energizes between busbar 253d1 and busbar 253d2.

When a current is supplied to the first heating zone A1 of the heating element 252 from a power source, such as a battery, via the busbar 253d1 and the busbar 253d2, the first heating zone A1 of the heating element 252 is heated. Since the first heating zone A1 and the second heating zone B1 are connected in parallel, the second heating zone B1 is also heated together with the first heating zone A1.

Heat generated in the first heating zone A1 and the second heating zone B1 warms the information transmitting/receiving area 26 of the windshield 20F and eliminates freezing and fogging of the surface of the glass plate 21 constituting the information transmitting/receiving area 26. This ensures good sensing by the device 300.

The positions of slits S1 and S2 can be defined such that the sum of the average interpolar distance of heating area 252a1 and the average interpolar distance of heating area 252a2 is equal to the average interpolar distance of heating area 252b. This allows the first heating zone A1 and the second heating zone B1 to generate the same amount of heat.

Figure 9A:
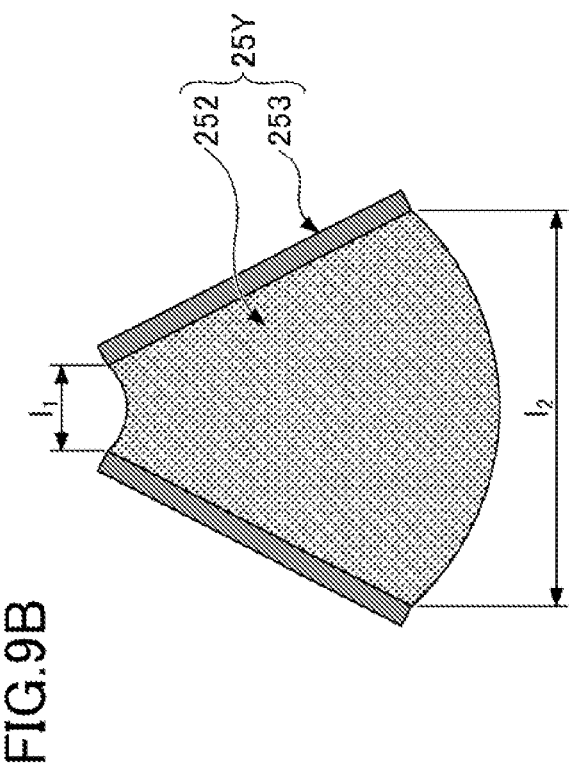
FIG. 9A is a diagram illustrating an interpolar distance of a busbar.
Figure 9B:
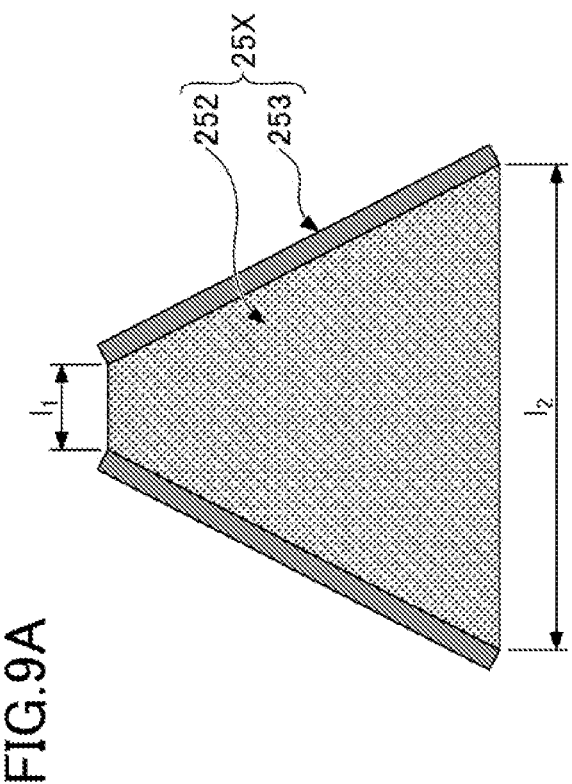
FIG. 9B is a diagram illustrating an interpolar distance of a busbar.
Figure 9C:
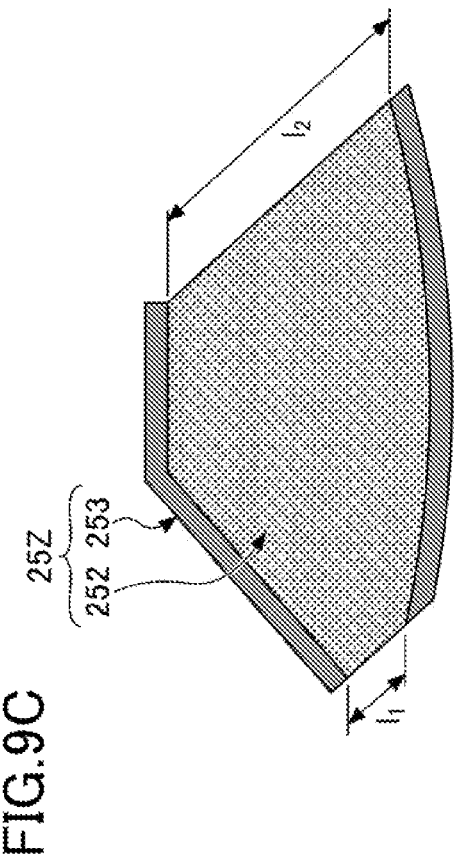
FIG. 9C is a diagram illustrating an interpolar distance of a busbar.

Here, the interpolar distance refers the linear distance between a pair of busbars with or without a slit. For example, as shown in FIGS. 9A to 9C, the minimum interpolar distance $l_1$ represents the linear distance where the distance between one set of busbars is closest, and the maximum interpolar distance $l_2$ represents the linear distance where the distance between one set of busbars is farthest. The average distance between poles is the average value of the minimum and maximum distance between poles.

The film 25X illustrated in FIG. 9A, the film 25Y illustrated in FIG. 9B, and the film 25Z illustrated in FIG. 9C are examples without slits. However, even if there are slits, the interpolar distance is specified in the same manner as when there are no slits.

When the film 25 is not rectangular in shape and when no slits are provided as illustrated in FIGS. 9A to 9C, the interpolar distances of the busbars 253 vary greatly depending upon the area within the heating element 252. As a result, a distribution of heat is generated in the heating element 252, resulting in an area where sufficient heat generating performance is not obtained.

As a countermeasure, in the fourth embodiment, as illustrated in FIG. 8, the heating element 252 is divided into three heating areas 252a1, 252a2 and 252b by slits S1 and S2. The divided heating areas 252a1 and 252a2 share the busbar 253ds and are connected in series.

As described above, by dividing the heating element 252 into a plurality of heating areas, the change in the interpolar distance of the busbar within each heating area can be reduced, so that the generation of the heating distribution within the heating area can be suppressed. As a result, the windshield 20F that is unlikely to impair the sensing performance of the device 300 due to freezing, fogging or the like, can be achieved.

The planar shape of the film 25 is an example of an isosceles trapezoid. When the planar shape of the film 25 is not rectangular, a slit is provided in the heating element 252 to obtain the effect of dividing the heating element into a plurality of heating areas. In particular, when the ratio of the maximum interpolar distance to the minimum interpolar distance of a busbar is 1.1 or more, the effect of providing a slit in the heating element 252 to divide the heating element into a plurality of heating areas is significant.

The heating element 252 is divided into two or more heating areas by at least one slit, and the two or more heating areas may be connected in series by sharing at least one busbar. If the above-described conditions are satisfied, the configuration according to the present embodiment is not limited, and the direction and the number of slits, the direction of the power supply of the busbar, the number of heating zones and the like can be freely set.

Fifth Embodiment

The fifth embodiment shows an example of providing a heating element that is different from the fourth embodiment. In the fifth embodiment, the description of the same configuration as that of the embodiment described above may be omitted.

Figure 10:
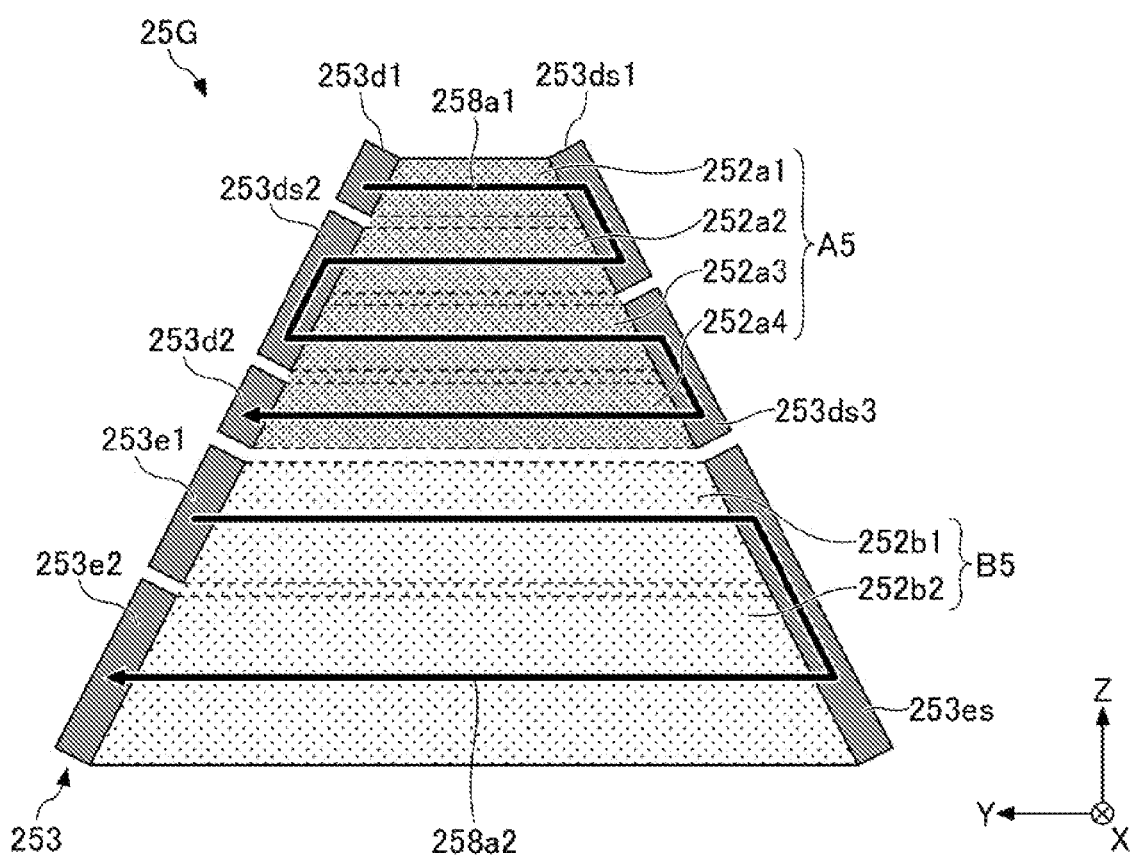
FIG. 10 is a planar view illustrating a film according to a fifth embodiment.

FIG. 10 is a planar view illustrating a film according to the fifth embodiment and schematically shows a view of the film viewed through the glass plate 22, the intermediate film 23, the protective film 254 or the like from outside to inside of the vehicle.

The film 25G according to the fifth embodiment differs from the film 25 (see FIGS. 2A and 2B, etc.) in that the heating element 252 has been replaced by the heating elements 258a1 and 258a2. In the film 25G, configurations other than heating elements such as the substrate 251 and the like are similar to the first embodiment.

The heating elements 258a1 and 258a2 are electric heat wires. The heating elements 258a1 and 258a2 are illustrated as a single wire, but in practice, an arrangement in which a plurality of electric heat wires is arranged in a predetermined interval is provided.

As described above, the material of the metal of the electric heat wire constituting the heating elements 258a1 and 258a2 is not particularly limited as long as the material of the metal is a conductive material. Examples of the material include (i) at least one metal selected from the group consisting of gold, silver, copper, aluminum, nickel, and tungsten, (ii) an alloy containing two or more metals selected from the group, and the like.

The film 25G has a first heating zone A5 on the substrate 251 provided with a heating element 258a1 and a second heating zone B5 on the substrate 251 provided with a heating element 258a2. The first heating zone A5 and the second heating zone B5 are connected in parallel.

The first heating zone A5 is divided into heating areas 252a1, 252a2, 252a3 and 252a4 due to the different specifications of the heating element 258a1, which is an electric heat wire. Here, the difference in specifications is the difference in the width, pitch, thickness, wire type, material and the like of the electric heat wire.

In the first heating zone A5, the busbar 253d1 is connected along the first end of the heating area 252a1 and the busbar 253ds1 is connected along the second end. The busbar 253$ds$2 is connected along the first end of the heating area 252$a$2 and the busbar 253$ds$1 is connected along the second end.

The busbar 253$ds$2 is connected along the first end of the heating area 252$a$3 and the busbar 253$ds$3 is connected along the second end. The busbar 253$d$2 is connected along the first end of the heating area 252$a$4 and the busbar 253$ds$3 is connected along the second end.

The busbar 253$ds$1 is shared by the heating areas 252$a$1 and 252$a$2. Also, the busbar 253$ds$2 is shared by heating areas 252$a$2 and 252$a$3. The busbar 253$ds$3 is also shared in the heating areas 252$a$3 and 252$a$4. That is, the heating elements 258$a$1 arranged in the heating areas 252$a$1, 252$a$2, 252$a$3 and 252$a$4 are connected in series between the busbars 253$d$1 and 253$d$2 via the busbars 253$ds$1, 253$ds$2 and 253$ds$3.

When a current is supplied to the heating element 258$a$1 from a power source, such as a battery, via the busbar 253$d$1 and the busbar 253$d$2, the first heating zone A5 generates heat.

The second heating zone B5 is divided into the heating areas 252$b$1 and 252$b$2 due to the difference in specifications of the heating element 258$a$2, which is an electric heat wire.

In the second heating zone B5, the busbar 253$e$1 is connected along the first end of the heating area 252$b$1 and the busbar 253$es$ is connected along the second end. The busbar 253$e$2 is connected along the first end of the heating area 252$b$2 and the busbar 253$es$ is connected along the second end.

The busbar 253$es$ is shared in the heating areas 252$b$1 and 252$b$2. That is, the heating element 258$a$2 arranged in the heating areas 252$b$1 and 252$b$2 is connected in series between the busbar 253$e$1 and the busbar 253$e$2 via the busbar 253$es$.

When a current is supplied to the heating element 258$a$2 from a power source, such as a battery, via the busbar 253$e$1 and the busbar 253$e$2, the second heating zone B5 is heated.

Heat generated in the first heating zone A5 and the second heating zone B5 warms the information transmitting/receiving area 26 of the windshield to eliminate freezing and fogging of the surface of the glass plate 21 constituting the information transmitting/receiving area 26. This ensures good sensing by the device 300.

As described above, by dividing each heating zone into a plurality of heating areas due to a difference in the specification of the heating element that is an electric heat wire, the change in the interpolar distance of the busbars within each heating area can be minimized, thereby preventing the generation of the heat generation distribution within the heating area. As a result, a windshield in which the sensing performance of the device 300 is not easily impaired due to freezing, fogging, or the like can be achieved.

It is not necessary that the width of the electric heat wire constituting the heating element 258$a$1 is constant in the heating area of each of the first heating zones A5, and the width of the electric heat wire may be different in the heating area of each of the first heating zones A5. Similarly, in each heating area of the second heating zone B5, the width of the electric heat wires constituting the heating element 258$a$2 need not be constant, and the width of the electric heat wires in each heating area of the second heating zone B5 may be different.

In the heating area of the first heating zone A5 and the second heating zone B5, in a case where the pitch of the electric heat wires is constant, it is preferable that the width of the electric wire is narrowest on the side closest to the upper side of the information transmitting/receiving area 26 and narrows as the wire approaches the lower side of the information transmitting/receiving area 26 when the windshield is mounted to the vehicle.

Specifically, for example, assuming that the electric heat wires have widths of W1, W2, W3, and W4 extending in order from the upper side to the lower side of the information transmitting/receiving area 26 when the windshield is mounted to the vehicle, it is preferable that width W1<W2<W3<W4.

In this way, the generation of the heat generation distribution in the heating area can be further suppressed. In addition, the generation of the heat generation distribution between the heating zones can be suppressed. In the film 25G, the number of heating zones or the number of heating areas can be freely set. For example, the number of heating zones and the number of heating areas may be adjusted in view of the pitch of electric heat wire and the width of wire constraints defined in view of the effect on the device 300.

Sixth Embodiment

The sixth embodiment shows an example of providing a heating element that is different from the first embodiment. In the sixth embodiment, the description of the same configuration portion as that of the embodiment described previously may be omitted.

Figure 11:
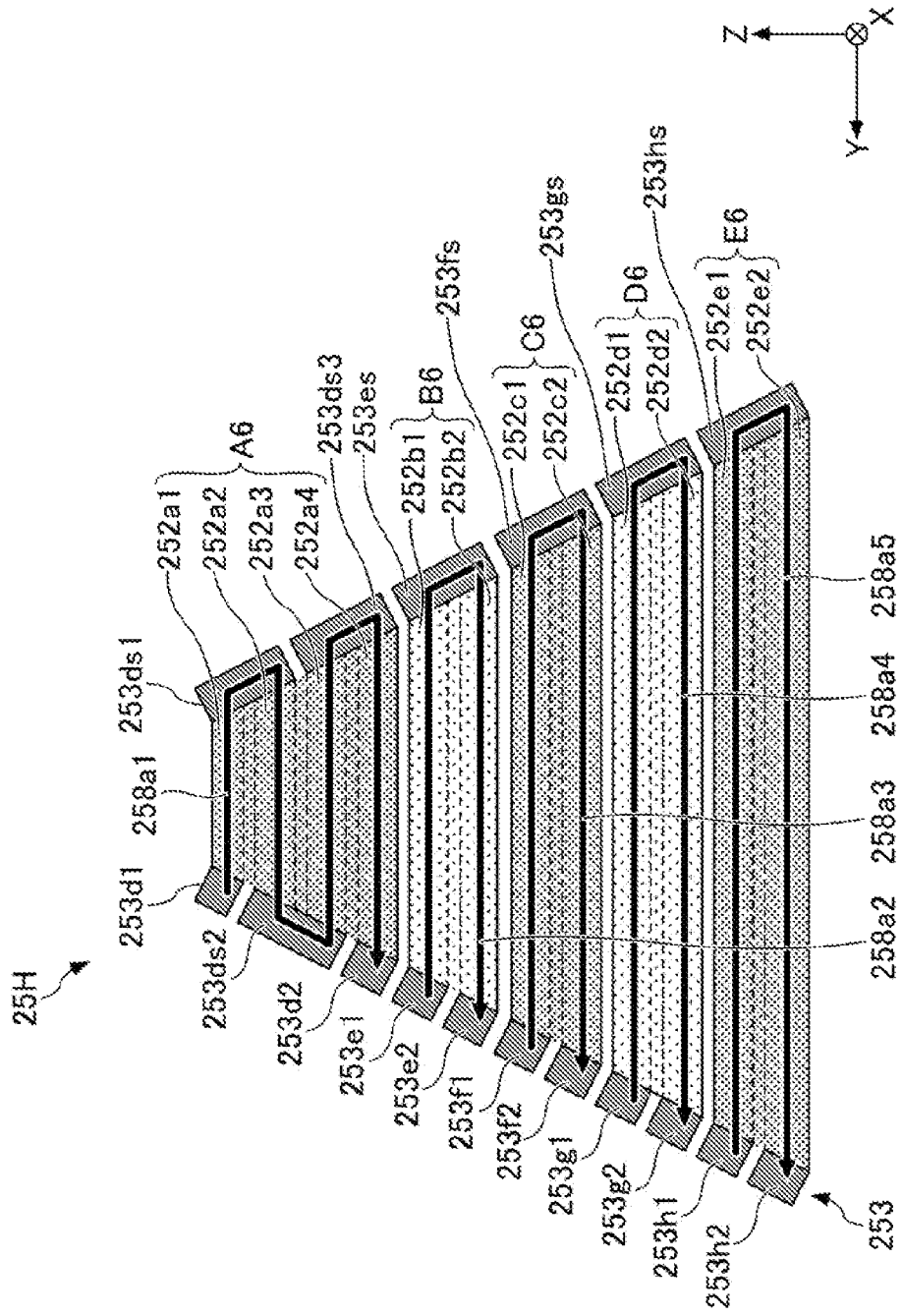
FIG. 11 is a planar view illustrating a film according to a sixth embodiment.

FIG. 11 is a planar view illustrating a film according to the sixth embodiment and schematically shows a view of the film viewed through the glass plate 22, the intermediate film 23, the protective film 254 or the like from outside to inside of the vehicle.

The film 25H according to the sixth embodiment differs from the film 25 (see FIGS. 2A and 2B, etc.) in that heating element 252 has been replaced by heating element 258$a$1, 258$a$2, 258$a$3, 258$a$4 and 258$a$5. In the film 25H, configurations other than heating elements such as the substrate 251 are similar to the first embodiment.

Heating elements 258$a$1, 258$a$2, 258$a$3, 258$a$4 and 258$a$5 are electric heat wires. The heating elements 258$a$1, 258$a$2, 258$a$3, 258$a$4 and 258$a$5 are illustrated as a single wire, but in practice, an arrangement in which a plurality of electric heat wires is placed at predetermined intervals is provided.

The heating elements 258$a$1, 258$a$2, 258$a$3, 258$a$4 and 258$a$5 are similar to the material of the electric heat wire metal in the fifth embodiment.

The film 25H includes a first heating zone A6 on the substrate 251 in which the heating element 258$a$1 is provided, a second heating zone B6 in which the heating element 258$a$2 is provided on the substrate 251, a third heating zone C6 in which the heating element 258$a$3 is provided on the substrate 251, a fourth heating zone D6 in which the heating element 258$a$4 is provided on the substrate 251, and a fifth heating zone E6 in which the heating element 258$a$5 is provided on the substrate 251. The first heating zone A6, the second heating zone B6, the third heating zone C6, the fourth heating zone D6 and the fifth heating zone E6 are connected in parallel.

The first heating zone A6 is divided into heating areas 252$a$1, 252$a$2, 252$a$3 and 252$a$4 due to differences in the specifications of the heating element 258$a$1, which is an electric heat wire.

In the first heating zone A6, the busbar 253$d$1 is connected along the first end of the heating area 252$a$1 and the busbar 253$ds$1 is connected along the second end. The busbar 253$ds$2 is connected along the first end of the heating area 252$a$2 and the busbar 253$ds$1 is connected along the second end.

The busbar 253$ds2$ is connected along the first end of the heating area 252$a3$ and the busbar 253$ds3$ is connected along the second end. The busbar 253$d2$ is connected along the first end of the heating area 252$a4$ and the busbar 253$ds3$ is connected along the second end.

The busbar 253$ds1$ is shared by the heating areas 252$a1$ and 252$a2$. Also, the busbar 253$ds2$ is shared by heating areas 252$a2$ and 252$a3$. The busbar 253$ds3$ is also shared in the heating areas 252$a3$ and 252$a4$. That is, the heating element 258$a1$ arranged in the heating areas 252$a1$, 252$a2$, 252$a3$ and 252$a4$ is connected in series between the busbars 253$d1$ and 253$d2$ via the busbars 253$ds1$, 253$ds2$ and 253$ds3$.

When a current is supplied to the heating element 258$a1$ from a power source, such as a battery, via the busbar 253$d1$ and the busbar 253$d2$, the first heating zone A6 generates heat.

The second heating zone B6 is divided into the heating areas 252$b1$ and 252$b2$ due to the difference in specifications of the heating element 258$a2$, which is an electric heat wire.

In the second heating zone B6, the busbar 253$e1$ is connected along the first end of the heating area 252$b1$ and the busbar 253$es$ is connected along the second end. The busbar 253$e2$ is connected along the first end of the heating area 252$b2$ and the busbar 253$es$ is connected along the second end.

The busbar 253$es$ is shared in the heating areas 252$b1$ and 252$b2$. That is, the heating element 258$a2$ arranged in the heating areas 252$b1$ and 252$b2$ is connected in series between the busbar 253$e1$ and the busbar 253$e2$ via the busbar 253$es$.

When a current is supplied to the heating element 258$a2$ from a power source, such as a battery, via the busbar 253$e1$ and the busbar 253$e2$, the second heating zone B6 generates heat.

The third heating zone C6 is divided into heating areas 252$c1$ and 252$c2$ due to the difference in specifications of the heating element 258$a3$, which is an electric heat wire.

In the third heating zone C6, the busbar 253$f1$ is connected along the first end of the heating area 252$c1$ and the busbar 253$fs$ is connected along the second end. The busbar 253$f2$ is connected along the first end of the heating area 252$c2$ and the busbar 253$fs$ is connected along the second end.

The busbar 253$fs$ is shared in heating areas 252$c1$ and 252$c2$. That is, the heating element 258$a3$ arranged in the heating areas 252$c1$ and 252$c2$ is connected in series between the busbar 253$f1$ and the busbar 253$f2$ via the busbar 253$fs$.

When a current is supplied to the heating element 258$a3$ from a power source, such as a battery, via the busbar 253$f1$ and the busbar 253$f2$, the third heating zone C6 generates heat.

The fourth heating zone D6 is divided into the heating areas 252$d1$ and 252$d2$ due to the difference in specifications of the heating element 258$a4$, which is an electric heat wire.

In the fourth heating zone D6, the busbar 253$g1$ is connected along the first end of the heating area 252$d1$, and the busbar 253$gs$ is connected along the second end. The busbar 253$g2$ is connected along the first end of the heating area 252$d2$ and the busbar 253$gs$ is connected along the second end.

The busbar 253$gs$ is shared in the heating areas 252$d1$ and 252$d2$. That is, the heating element 258$a4$ arranged in the heating areas 252$d1$ and 252$d2$ is connected in series between the busbar 253$g1$ and the busbar 253$g2$ via the busbar 253$gs$.

When a current is supplied to the heating element 258$a4$ from a power source, such as a battery, via the busbar 253$g1$ and the busbar 253$g2$, the fourth heating zone D6 generates heat.

The fifth heating zone E6 is divided into the heating areas 252$e1$ and 252$e2$ due to the difference in specifications of the heating element 258$a5$, which is an electric heat wire.

In the fifth heating zone E6, the busbar 253$h1$ is connected along the first end of the heating area 252$e1$ and the busbar 253$hs$ is connected along the second end. The busbar 253$h2$ is connected along the first end of the heating area 252$e2$ and the busbar 253$hs$ is connected along the second end.

The busbar 253$hs$ is shared by the heating areas 252$e1$ and 252$e2$. That is, the heating element 258$a5$ arranged in the heating areas 252$e1$ and 252$e2$ is connected in series between the busbars 253$h1$ and 253$h2$ via the busbars 253$hs$.

When a current is supplied to the heating element 258$a5$ from a power source, such as a battery, via the busbar 253$h1$ and the busbar 253$h2$, the fifth heating zone E6 generates heat.

Heat generated in the first heating zone A6, the second heating zone B6, the third heating zone C6, the fourth heating zone D6, and the fifth heating zone E6 warms the information transmitting/receiving area 26 of the windshield and eliminates freezing and fogging of the surface of the glass plate 21 constituting the information transmitting/receiving area 26. This ensures good sensing by the device 300.

As described above, by dividing each heating zone into a plurality of heating areas due to a difference in the specifications of the heating element that is an electric heat wire, the change in the interpolar distance of the busbars within each heating areas can be minimized, thereby preventing the generation of the heat generation distribution within the heating area. In addition, the generation of the heat generation distribution between the heating zones can be suppressed. As a result, a windshield in which the sensing performance of the device 300 is not easily impaired due to freezing, fogging or the like can be achieved.

In addition, in the first heating zone A6, the second heating zone B6, the third heating zone C6, the fourth heating zone D6, and the fifth heating zone E6, the pitch of the electric heat wire constituting the heating element does not need to be constant, and the pitch of the electric heat wire may differ in each heating zone.

If the wire diameter of each heating zone is constant and the width of each heating zone is constant, in the pitch of each heating zone, the pitch of the electric heat wire is preferably narrow as the interpolar distance of the busbars in each heating zone increases.

Specifically, it is preferable that when the windshield is mounted to a vehicle, when the interpolar distance of the busbar in the first heating zone A6 closest to the upper side of the information transmitting/receiving area 26 is Hz1, the pitch of the electric heat wire is Pz1, the interpolar distance of the busbar in the second heating zone B6 is Hz2, the pitch of the electric heat wire is Pz2, the interpolar distance of the busbar in the third heating zone C6 is Hz3, the pitch of the electric heat wire is Pz3, the interpolar distance of the busbar in the fourth heating zone D6 is Hz4, the pitch of the electric heat wire is Pz4, the interpolar distance of the busbar in the fifth heating zone E6 is Hz5, and the pitch of the electric heat wire is Pz5, the relationship of the pitch of the electric heat wire satisfy Pz1>Pz2>Pz3>Pz4>Pz5 when the relationship of the interpolar distance of the busbar satisfy Hz1<Hz2<Hz3<Hz4<Hz5.

In this way, the generation of the heat generation distribution between the heating zones can be further suppressed. In addition, in the film 25H, the number of heating zones or the number of heating areas can be freely set. For example, the number of heating zones and the number of heating areas can be adjusted in consideration of restrictions on the pitch and width of the electric heat wire, which are determined in consideration of the influence on the device 300.

EXAMPLES

Example 1

In Example 1, the windshield 20 (see FIGS. 2A and 2B) in which the film 25 was adhered to the vehicle-exterior side surface 21b of the glass plate 21 on the inner side of a vehicle via the adhesive layer 29 was prepared. In the windshield 20, the thickness of the glass plates 21 and 22 was set to 2 mm, respectively, and the thickness of the intermediate film 23 was set to 0.76 mm. A polyethylene terephthalate having a thickness of 70 μm was used as the substrate 251, and tin-doped indium oxide was used as the heating element 252. The sheet resistance of the heating element 252 was 50 Ω/squared. The busbar 253 was 20 μm in width and prepared by a screen-printing silver paste. A polyethylene terephthalate having a thickness of 18 μm was used for the protective film 254, and an acrylic adhesive layer having a thickness of 30 μm was used for the adhesive layer 29.

Example 2

In Example 2, the windshield 20B (see FIG. 4) in which the film 25 was adhered to the vehicle-interior side surface 22b in the outer glass plate 22 via the adhesive layer 29 was prepared. In the windshield 20B, the thickness of the glass plates 21 and 22 was set to 2 mm, respectively, and the thickness of the intermediate film 23 was set to 0.76 mm. The substrate 251, heating element 252, busbar 253, protective film 254 and adhesive layer 29 were the same as in Example 1.

Comparative Example 1

In Comparative Example 1, the windshield in which the film 25 was adhered to the vehicle-interior side surface 21a of the glass plate 21 via the adhesive layer 29 was prepared. In the windshield of Comparative Example 1, the thickness of the glass plates 21 and 22 was set to 2 mm, respectively, and the thickness of the intermediate film 23 was set to 0.76 mm. The substrate 251, heating element 252, busbar 253, protective film 254 and adhesive layer 29 were the same as in Example 1.

Comparative Example 2

In Comparative Example 2, the windshield was prepared in which the intermediate film 23 was a two-layer structure of the first intermediate film on the glass plate 21 side and the second intermediate film on the glass plate 22 side, and the film 25 was sandwiched between the first and second intermediate films. In the windshield of Comparative Example 2, the thickness of the glass plates 21 and 22 was set to 2 mm each, the thickness of the first intermediate film was set to 0.38 mm, and the thickness of the second intermediate film was set to 0.76 mm, respectively. The substrate 251, heating element 252, busbar 253, protective film 254 and adhesive layer 29 were the same as in Example 1.

[Evaluation]

Figure 12:
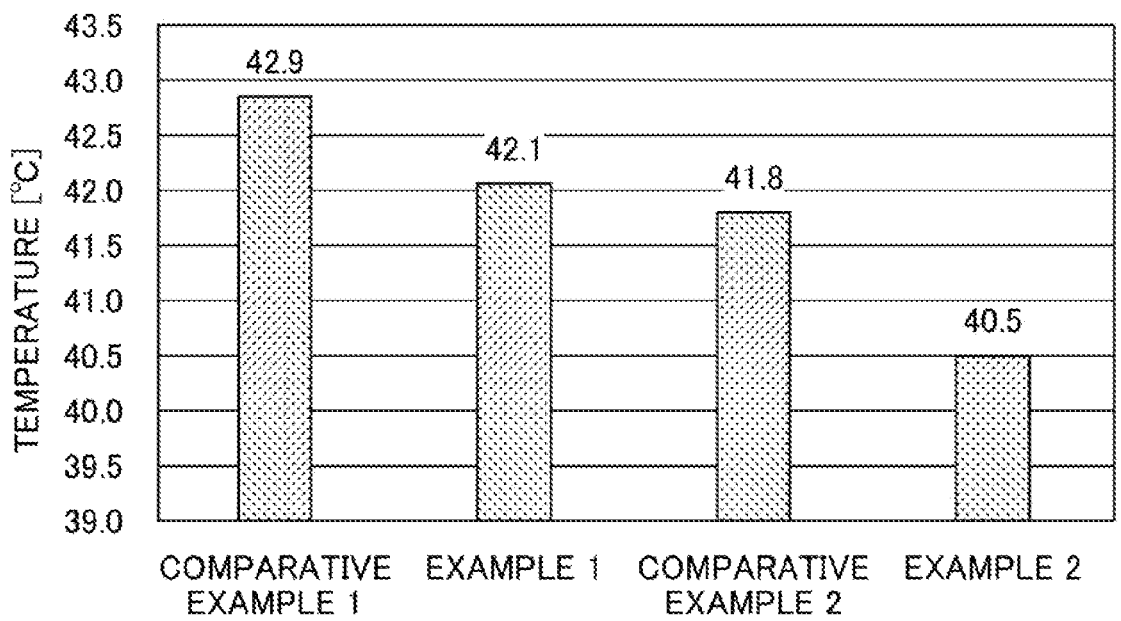
FIG. 12 is a diagram showing the results of Examples and Comparative Examples.

In each of the windshields of Examples 1 and 2 and Comparative Examples 1 and 2, the film 25 was energized to measure the temperature of the vehicle-interior side surface 21a of the glass plate 21 in the steady state of information transmitting/receiving area 26, and the results were summarized in FIG. 12.

The test conditions were as follows.
Internal and external temperature in a vehicle: 20 [° C.]
External convection heat transfer coefficient in a vehicle 20 [W/m²/K]
Internal convection heat transfer coefficient in a vehicle: 9 [W/m²/K]
Heat generation of film 25: 600 [W/m²]
Thermal conductivity of glass plates 21 and 22: 1 [W/m/K]
Thermal conductivity of intermediate film 23: 0.19 [W/m/K]

As shown in FIG. 12, in both Examples 1 and 2 and Comparative Examples 1 and 2, the temperature of the vehicle-interior side surface 21a of the glass plate 21 in the steady-state of information transmitting/receiving area 26 was equal to or greater than the internal and external temperatures in a vehicle of +20° C. This was the temperature at which the original purpose of eliminating freezing and fogging of the information transmitting/receiving area 26 was achieved. It has been confirmed that the temperatures of Examples 1 and 2 in a manner in which the film was enclosed in the windshield through a thin adhesive layer was achieved at the same temperature as those of Comparative Examples 1 and 2 in a conventional manner.

Also, Example 1 had a higher temperature than Example 2. From this result, from the viewpoint of increasing the temperature, the film 25 was preferably adhered to the vehicle-exterior side surface 21b of the inner glass plate 21 rather than the film 25 was adhered to the vehicle-interior side surface 22b of the outer glass plate 22 via the adhesive layer 29.

Some Comparative Examples were superior to Examples only in comparison with the temperature shown in FIG. 12. However, in Examples 1 and 2, since the film was enclosed in the windshield via a thin adhesive layer, as described above, there was an effect of improving the degree of freedom of the design of the planar shape of the film, and maintaining the smoothness of the inner and outer surfaces of the film by reducing wrinkles of the film. Therefore, Examples 1 and 2 were superior to Comparative Examples 1 and 2 in that the temperature of the inside and outside of a vehicle was achieved at +20° C. or higher.

Although the preferred embodiment has been described in detail above, various modifications and substitutions can be made to the above-described embodiment without departing from the scope of the claims.

For example, a water absorbing or hydrophilic anti-fogging coating or an anti-fogging film may be provided on the vehicle-interior side surface 21a of the glass plate 21 to further improve sensing performance of the device 300. Also, an Anti-Reflection (AR) coating may be provided on the vehicle-interior side surface 21a of the glass plate 21 or the film 25 itself to further improve sensing performance of the device 300.

The substrate 251 itself may also have the function of the adhesive layer 29. When the substrate 251 has the function of the adhesive layer 29, the components of the film 25 may be reduced and factors that impair the sensing performance of the device 300 may be reduced. In this case, the thickness of the substrate 251 is 5 µm or more and 60 µm or less.

Figure 13:
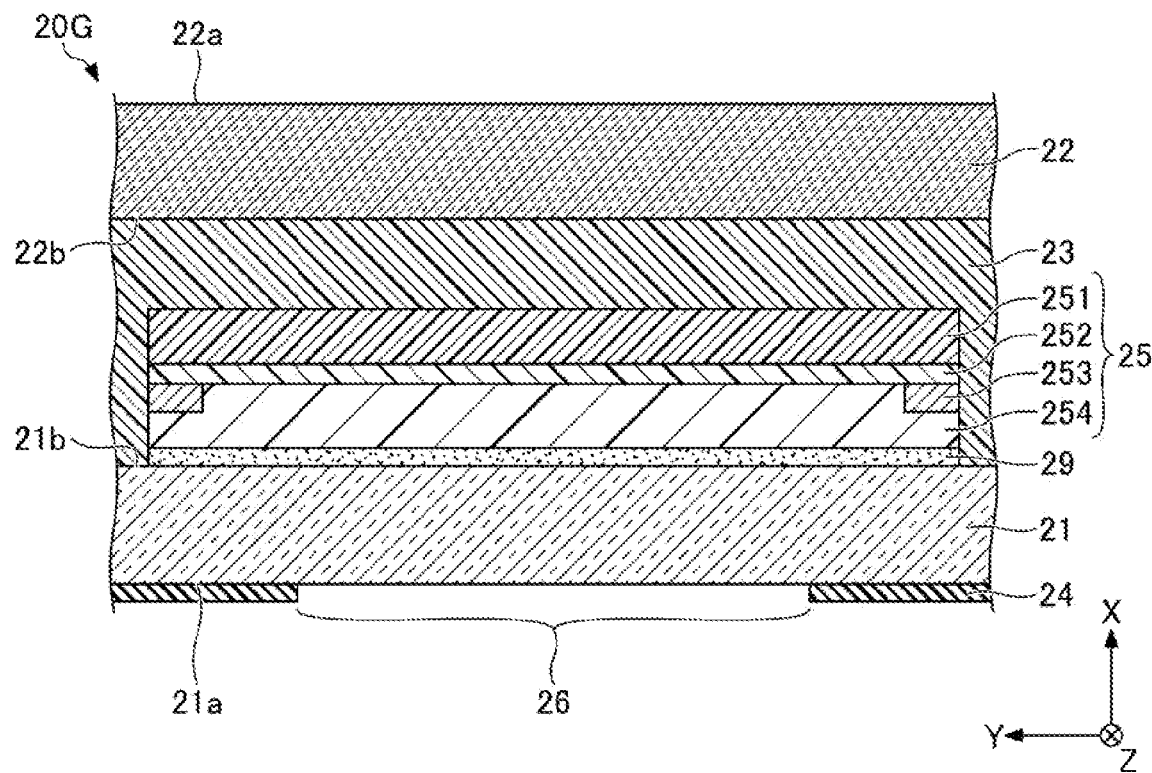
FIG. 13 is a cross-sectional view illustrating a film according to a second modification of the first embodiment.
Figure 14:
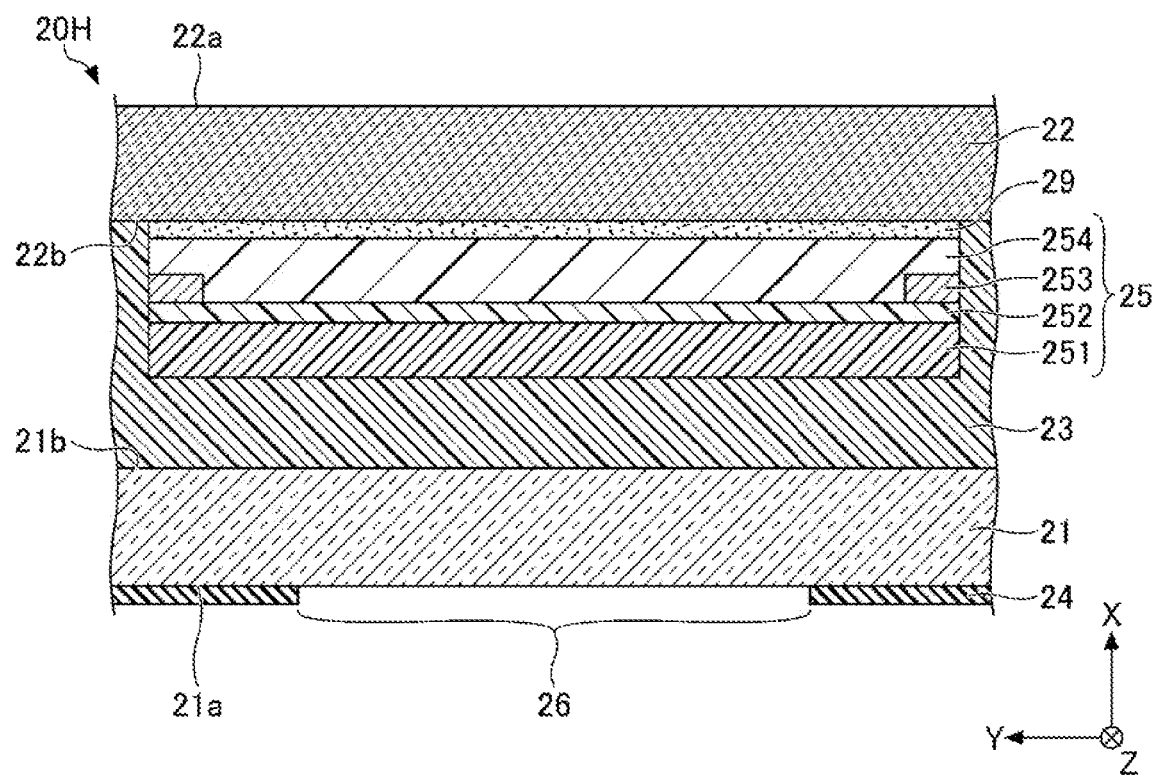
FIG. 14 is a cross-sectional view illustrating a film according to a second modification of the second embodiment.

As a second modification of the first embodiment, the glass plate 21, the adhesive layer 29, the protective film 254, the busbar 253, the heating element 252, the substrate 251, the intermediate film 23 and the glass plate 22 may be sequentially placed from the interior side of a vehicle, as shown in the windshield 20G illustrated in FIG. 13. As a second modification of the second embodiment, the glass plate 21, the intermediate film 23, the substrate 251, the heating element 252, the busbar 253, the protective film 254, the adhesive layer 29 and the glass plate 22 may be sequentially placed from the interior side of a vehicle, as shown in the windshield 20H illustrated in FIG. 14.

Also, when multiple devices are mounted in a vehicle, a busbar may be placed between the locations where the respective devices are mounted in the information transmitting/receiving area 26. Otherwise, a busbar may be positioned above and below the information transmitting/receiving area 26.

Further, since the shielding layer 24 is provided on the glass plate 21, the fluoroscopic distortion is aggravated, the end of the shielding layer 24 may be separated from the information transmitting/receiving area 26, and a coloring layer having the same color as the shielding layer 24 may be provided on the peripheral portion of the film 25.

DESCRIPTION OF THE REFERENCE NUMERALS 20, 20A, 20B, 20C, 20D, 20E, 20F, 20G, 20H Windshield
21,22 Glass plate
23 Intermediate film
24 Shielding layer
25,25D,25E,25F,25G,25H Film
26 Information transmitting/receiving area
29, 39 Adhesive layer
251 Substrate
252, 258a1, 258a2, 258a3, 258a4, 258a5 Heating element
253 Busbar
254 Protective film
300 Device

The invention claimed is:

1. A laminated glass for a vehicle, the laminated glass having an intermediate film between an outer glass plate and an inner glass plate, comprising:
   a test area A defined by JIS Standard R3212;
   an information transmitting/receiving area in which a device installed in a vehicle transmits and/or receives information; and
   a film capable of heating the information transmitting/receiving area, the film being adhered to an area that is outside of the test area A and overlaps the information transmitting/receiving area in a planar view between the intermediate film and either one of the outer glass plate or the inner glass plate, wherein the film comprises a substrate, a planar heating element on a surface of the substrate, and a busbar connected to the heating element, the planar heating element conforms to a shape of the surface of the substrate, the planar heating element covers the entirety of the surface of the substrate except for at least one slit, each of the at least slit extends through a thickness of the planar heating element in a direction perpendicular to the surface of the substrate, the planar heating element is divided into two or more planar heating areas by the at least one slit, the two or more planar heating areas share at least one busbar and are connected in series, and each of the at least one slit has a width of 0.3 mm or less in a direction parallel to the surface of the substrate.

2. The laminated glass according to claim 1, wherein the film is adhered to the inner glass plate for the vehicle via an adhesive layer.

3. The laminated glass according to claim 2, wherein a thickness of the adhesive layer is 5 µm or more and 120 µm or less.

4. The laminated glass according to claim 2, wherein the adhesive layer has an adhesive force of 10 N/25 mm or more to the inner glass plate for the vehicle based on a 180 deg peel test at a tensile speed of 300 mm/min.

5. The laminated glass according to claim 2, wherein the adhesive layer is formed of at least one resin selected from the group consisting of an acrylic, acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, and polyvinyl butyral.

6. The laminated glass according to claim 1, wherein a visible light transmittance Tv of the information transmitting/receiving area including the film, is 70% or more.

7. The laminated glass according to claim 1, wherein a haze of the information transmitting/receiving area including the film is 1% or less.

8. The laminated glass according to claim 1, wherein the heating element is formed from gold, silver, copper, or tin-doped indium oxide.

9. The laminated glass according to claim 1, wherein the busbar is formed from (i) at least one metal selected from the group consisting of silver, copper, tin, gold, aluminum, iron, tungsten, and chromium, (ii) an alloy containing two or more metals selected from the group, or (iii) a conductive organic polymer.

10. The laminated glass according to claim 1, wherein the substrate is formed from a homopolymer or copolymer of at least one monomer selected from the group consisting of polyester, polyamide, polyether, polysulfone, polyether sulfone, polycarbonate, polyarylate, polyetherimide, polyether ether ketone, polyimide, aramid, polybutylene terephthalate, polyvinyl butyral, and polyethyl vinyl acetate.

11. The laminated glass according to claim 1, wherein a thickness of the substrate is 5 µm or more and 500 µm or less.

12. The laminated glass according to claim 1, wherein the heating element is divided into at least a first heating area, a second heating area and a third heating area heating, the first heating area is divided from the second heating area by a first slit, the second heating area is divided from the third heating by a second slit parallel to the first slit, wherein a distance between the first slit and the second slit is 10 mm or more.

13. The laminated glass according to claim 1, wherein the at least one slit has the width of 0.1 mm or less.

* * * * *